(12) United States Patent
Lee et al.

(10) Patent No.: US 11,311,029 B2
(45) Date of Patent: Apr. 26, 2022

(54) PREBIOTIC COMPOSITION

(71) Applicant: ABERYSTWYTH UNIVERSITY, Aberystwyth Ceredigion (GB)

(72) Inventors: Andrew John Lee, Leicestershire (GB); Joseph Gallagher, Ceredigion (GB); Steven Anthony Fish, Lancashire (GB); Stephen Michael Morris, Ceredigion (GB)

(73) Assignee: Aberystwyth University, Ceredigion (GB)

( * ) Notice: Subject to any disclaimer, the term of this patent is extended or adjusted under 35 U.S.C. 154(b) by 0 days.

(21) Appl. No.: 15/037,917

(22) PCT Filed: Nov. 19, 2014

(86) PCT No.: PCT/GB2014/053414
§ 371 (c)(1),
(2) Date: May 19, 2016

(87) PCT Pub. No.: WO2015/075440
PCT Pub. Date: May 28, 2015

(65) Prior Publication Data
US 2016/0278422 A1    Sep. 29, 2016

(30) Foreign Application Priority Data

Nov. 19, 2013 (GB) .................................. 1320409

(51) Int. Cl.
| | |
|---|---|
| *A23K 10/30* | (2016.01) |
| *A23K 10/18* | (2016.01) |
| *A23K 10/37* | (2016.01) |
| *A23L 33/22* | (2016.01) |
| *A23L 33/135* | (2016.01) |

(52) U.S. Cl.
CPC .............. *A23K 10/30* (2016.05); *A23K 10/18* (2016.05); *A23K 10/37* (2016.05); *A23L 33/135* (2016.08); *A23L 33/22* (2016.08); *A23V 2002/00* (2013.01); *A23V 2200/00* (2013.01); *A23Y 2220/49* (2013.01); *A23Y 2220/67* (2013.01); *A23Y 2220/73* (2013.01); *A23Y 2300/55* (2013.01); *Y02P 60/87* (2015.11)

(58) Field of Classification Search
CPC ........ A23K 10/30; A23K 10/18; A23K 10/37; A23L 33/22; A23L 33/135; A23V 2200/3202; A23V 2200/00; A23Y 2220/67
USPC ..................................................... 426/61, 62
See application file for complete search history.

(56) References Cited

U.S. PATENT DOCUMENTS

| | | | |
|---|---|---|---|
| 5,334,516 A | 8/1994 | Muramatsu et al. | |
| 5,659,028 A | 8/1997 | Coussement et al. | |
| 2004/0235788 A1 | 11/2004 | Mobasseri et al. | |
| 2009/0252719 A1* | 10/2009 | Philipps | A61K 38/47 424/94.61 |

FOREIGN PATENT DOCUMENTS

GB    2498543 A    7/2013

OTHER PUBLICATIONS

Santiago-Garcia, P. A. et al. Dynamic Biochem, Process Biotechnol. and Mol. Biol. 3: 52-57 (2009) (Year: 2009).*
Winters, A. L. et al., Aspects and Appl. Biol. 101: 79-86 (Year: 2010).*
Bancal and Gaudillere, "Rate of accumulation of fructan oligomers in wheat seedlings (*Triticum aestivum* L.) during the early stages of chilling treatment," New Phytol. 112: 459-463, 1989.
Pavis et al., "Structure of fructans in roots and leaf tissues of *Lolium perenne*," New Phytologist 150: 83-95, 2001.
Simmen et al., "Fructan Synthesis in Excised Barley Leaves. Identification of Two Sucrose-Sucrose Fructosyltransferases Induced by Light and Their Separation from Constitutive Invertases," Plant. Physiol. 101: 459-468, 1993.

* cited by examiner

*Primary Examiner* — Hamid R Badr
(74) *Attorney, Agent, or Firm* — Howson & Howson LLP

(57) ABSTRACT

A composition comprising branched fructan molecules derived from a fructan extract of perennial high sugar grass (HSG) selected from the group consisting of AberMagic cultivar, AberDart cultivar, and S48 (*Lolium* spp), and obtained by enzymic endo-hydrolase hydrolysis, wherein said branched fructan molecules have a molecular weight of between 0.3 to 3 kDa, and wherein at least 50% of the branched fructan molecules present in the composition have a molecular weight of between 0.48 and 1.9 kDa is provided. Also provided are feed or food supplement comprising such a composition, a method of producing a composition comprising branched fructan molecules, and a method of making a feed or foodstuff.

13 Claims, 11 Drawing Sheets

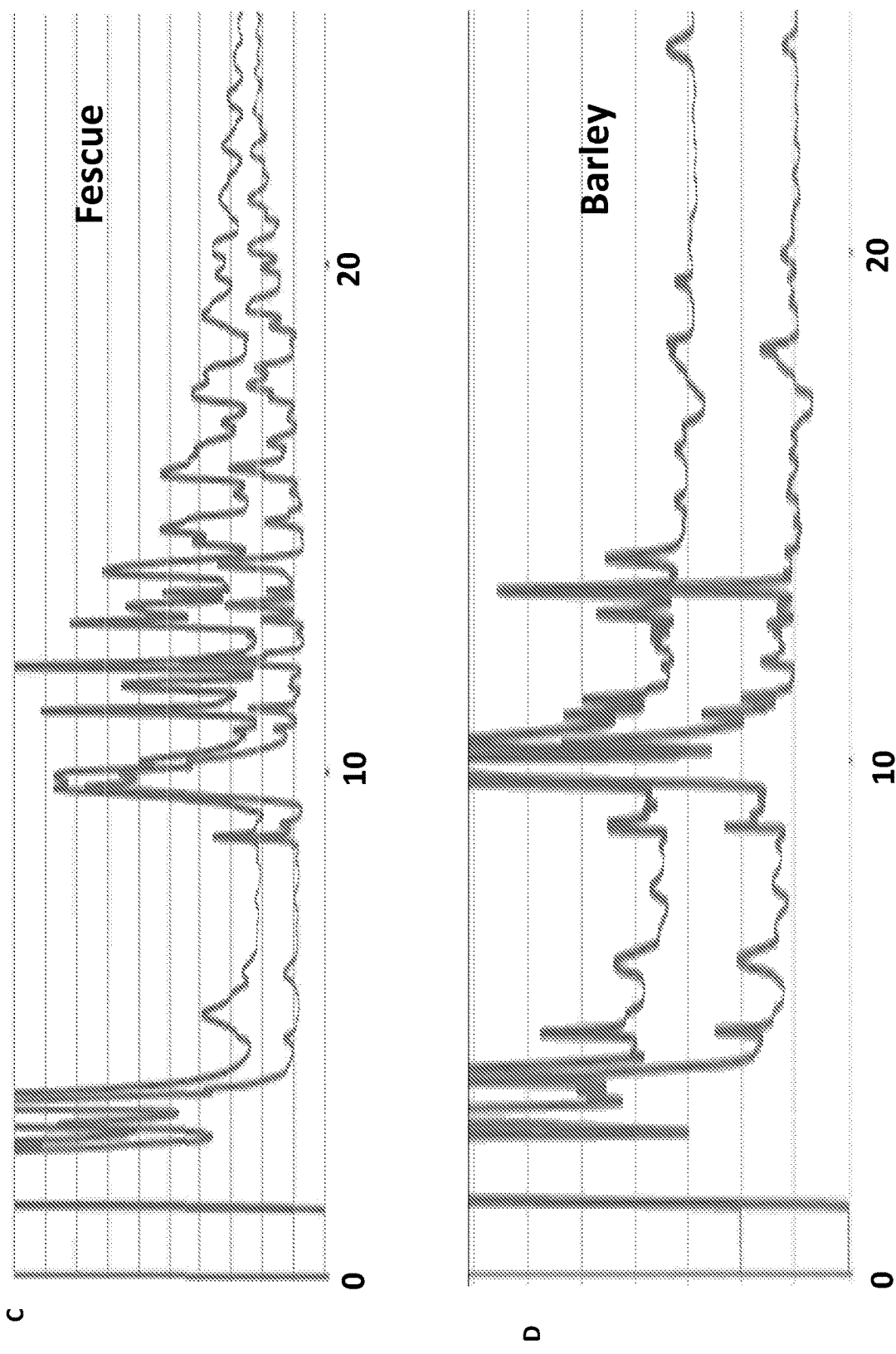
Figure 6 (cont')

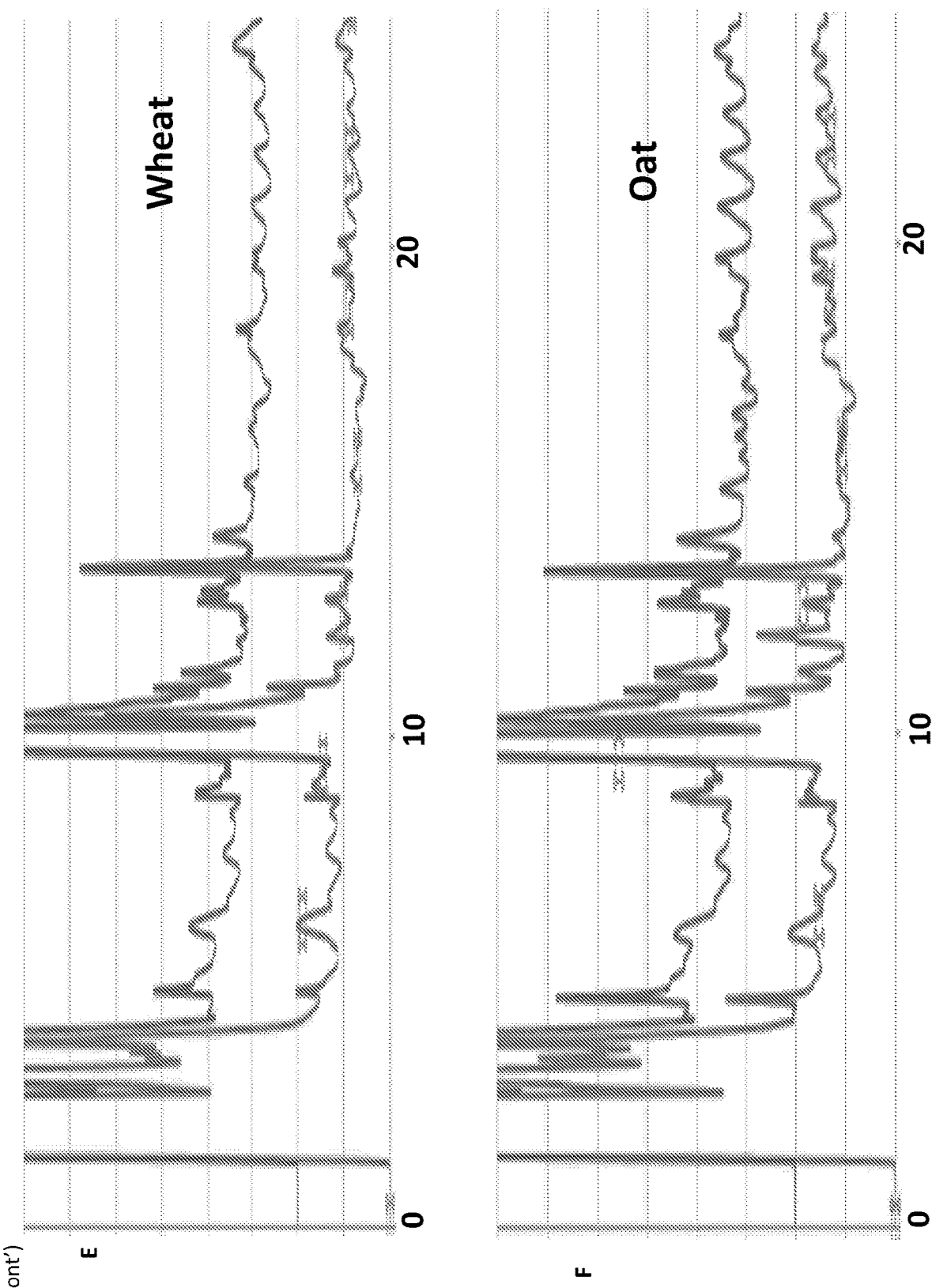
Figure 6 (cont')

PREBIOTIC COMPOSITION

CROSS-REFERENCES TO RELATED APPLICATIONS

This application is a U.S. national phase application of International PCT Patent Application No. PCT/GB2014/053414, which was filed on Nov. 19, 2014, which claims priority to GB Patent Application No. 1320409.4, filed Nov. 19, 2013. These applications are incorporated herein by reference in their entireties.

FIELD OF INVENTION

The present invention relates to prebiotic compositions and their use as feed and food supplements. The present invention also relates to methods of producing prebiotic compositions.

BACKGROUND TO THE INVENTION

The field of prebiotic oligosaccharides as functional ingredients in food has developed considerably since the term "prebiotic" was introduced by Gibson and Roberfroid in 1995. They defined prebiotics as "a non-digestible food ingredient that beneficially affects the host by selectively stimulating the growth and/or activity of one or a limited number of bacteria in the colon, and thus improves host health."

Since its introduction, the concept of prebiotics has attracted much attention, stimulating scientific as well as industrial interest. Whilst carbohydrates are the most abundant biological material in nature, not all dietary carbohydrates are prebiotics. There in fact exists clear criteria for classifying a food ingredient as a prebiotic. These criteria are 1) resistance to gastric acidity, to hydrolysis by mammalian enzymes, and to gastrointestinal absorption; 2) fermentation by intestinal microflora; and 3) selective stimulation of the growth and/or activity of those intestinal bacteria that contribute to health and well-being.

The leading prebiotic molecules on the European market are fructooligosaccharides (FOS). The most common fructooligosaccharides (1F series) are those that are currently marketed as probiotics and are formed by fructose molecules bound by beta 2-1 bonds, with a glucose molecule at one end abbreviated as GFn, with n typically being comprised between 2 and 4 (kestose, nystose and fructosylnystose). Fructooligosaccharides of the second type, the 6F series, in which the fructose molecules are bound by beta 2-6 bonds, with a glucose molecule at the non-reducing end, are being intensively investigated. These FOS are naturally found in the form of high molecular weight polymers (levans). The third type of FOS, the 6G series, e.g. Neokestose, is a trisaccharide in which a fructose is bound by a beta 2-6 bond to the glucose unit in sucrose. All three types of FOS resist digestion in the upper part of the gastro-intestinal tract and are readily metabolisable by the endogenous bacteria of the colon.

Fructans occur in plants as branched or linear polyfructose molecules synthesised de novo from sucrose and are polymers of D-fructose carrying a D-glucosyl residue at the end of, or in the middle of, the chain attached via a (2-1) linkage as in sucrose.

High molecular weight inulin type fructans are known to positively affect gastrointestinal performance, through their prebiotic properties. This type of inulin can be only be partially digested by humans. When consumed, the undigested portion serves as food for "friendly" bacteria, such as Bifidobacteria and *Lactobacillus* species. Clinical studies have shown that administering inulin can increase the number of these friendly bacteria in the colon while simultaneously reducing the population of harmful bacteria. Other reported benefits of inulin include increased production of beneficial short-chain fatty acids such as butyrate, increased absorption of calcium and magnesium, and improved elimination of toxic compounds. Clinical studies have also shown an anti-carcinogen effect for these fructan prebiotics. Studies in rats showed that inulin when given with a probiotic as a mixture decreased the instance of colon tumours induced by colon carcinogen Azoxymethane.

Whilst various prebiotics are known, there is a need for new prebiotics, especially prebiotics which work more effectively. Isolating fructans from high-sugar grasses provides a highly abundant source material which can be harvested multiple times a year and which can be grown in hugely diverse geographies and conditions. The use of high-sugar grasses to provide a highly effective novel prebiotic material could be a possible solution to the increased demand and lower prices being sought by both the human pre/probiotics and animal feed markets.

The inventors have postulated that high-sugar grasses could be used as a cheap and abundant source of prebiotic fructans. High sugar grasses grow in a wider range of geographies than traditional sources of prebiotic fructans (chicory and Jerusalem artichokes), they are easier to harvest (not requiring the removal of the whole plant) and they are not a food crop; being cheaper for manufacturers to purchase in bulk.

SUMMARY OF THE INVENTION

According to a first aspect of the present invention there is provided a prebiotic composition comprising branched fructan molecules, wherein said branched fructan molecules have at least one of the following characteristics; a) a molecular weight of between about 0.3 to about 3 kDa; b) a fructan chain length of about 2 to about 15 fructose units and/or, c) an elution time of 7 to 22 minutes on a Dionex HPAEC-PAD column.

As used herein, a prebiotic is: a non-digestible food ingredient that beneficially affects the host by selectively stimulating the growth and/or the activity of one or a limited number of beneficial bacteria.

Such prebiotics can exert a positive effect on the gut flora, specifically in the left side of the colon, an area of the gut which is especially prone to disorders in particular bowel cancer and ulcerative colitis.

It will be understood that the prebiotic fructan molecules of the present invention are branched rather the linear inulin molecules. In a preferred embodiment, the branched fructan molecules contain both β(2-1) and β(2-6) linkages.

Without wishing to be bound by any theory, the inventors believe that the branched fructan molecules of the present invention provide an improved prebiotic effect due to their particular size range which allows them to be more easily metabolisable by the endogenous bacteria of the colon.

According to a second aspect of the present invention there is provided a composition comprising the prebiotic composition of the first aspect and a probiotic microorganism.

According to a third aspect of the present invention there is provided a method of producing the prebiotic composition comprising branched fructan molecules according to the present invention, said method comprising hydrolysing a fructan extract.

According to a fourth aspect of the present invention there is provided a feed or food supplement comprising the prebiotic composition of the present invention.

According to a fifth aspect of the present invention there is provided a feed- or foodstuff comprising a feed or food material and the feed or food supplement or prebiotic composition according to the present invention.

According to a sixth aspect of the present invention, there is provided a method of making a feed or foodstuff comprising adding to a feed or food material a feed or food supplement or prebiotic composition according to the present invention.

It will be understood that any of the preferred features disclosed herein is considered to be equally applicable to any of the aspects described above unless explicitly stated otherwise. Any preferred feature is also considered to be disclosed in combination with any other preferred feature disclosed herein.

Preferably, the branched fructan molecules of the composition have a fructan chain length of about 3 to about 12, about 3 to about 10, fructose units. In a preferred embodiment the fructan chain length is about 4 about 8 fructose units.

Preferably, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, 100% of the branched fructan molecules present in the composition have a fructan chain length within the preferred ranges. More preferably at least 80% of the branched fructan molecules present in the composition have a fructan chain length within the preferred ranges.

Preferably the molecular weight of the branched fructan molecules of the composition is between about 0.35 and about 2.75 kDa, about 0.4 and about 2.5 kDa, about 0.45 and about 2.3 kDa, about 0.46 and about 2.2 kDa, about 0.47 and about 2.0 kDa, about 0.48 and about 1.9 kDa. Preferably, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, 100% of the branched fructan molecules in the prebiotic composition have a molecular weight within the preferred ranges. More preferably, at least 80% of the branched fructan molecules in the prebiotic composition have a molecular weight within the preferred ranges.

In a preferred embodiment, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, 100% of the fructan molecules in the prebiotic composition are branched fructan molecules.

In one embodiment, the branched fructan molecules of the composition are obtained from one or more grasses.

In a preferred embodiment of the present invention the branched fructans of the present invention are obtained by hydrolysis of a fructan extract. Preferably by hydrolysis of a fructan extract from grass.

Preferably, the hydrolysis is enzymatic hydrolysis.

In one embodiment, the hydrolysis is performed by an endo-hydrolase enzyme. Preferably, by an inulin endo-hydrolase enzyme, more preferably by Novozymes 960 inulin endo-hydrolase enzyme (available from Novozymes A/S Krogshoejvej 36 2880 Bagsvaerd Denmark).

The inventors have surprisingly discovered that when fructan extract produced from one or more grasses is subjected to hydrolysis using the above inulin endo-hydrolase, the extract is greatly enriched for the branched fructan molecules of the present invention.

In a preferred embodiment, at least 30%, at least 40%, at least 50%, at least 60%, at least 70%, at least 75%, at least 80%, at least 85%, at least 90%, at least 95%, at least 97%, at least 98%, at least 99%, preferably 100% of the branched fructan molecules present in the grass extract is converted to the branched fructan molecules of the present invention.

As used herein, the term fructan extract refers to the juice produced when the fructan containing vegetable matter is extracted by, for example, pressing. It will be understood that the vegetable matter can be any suitable vegetable matter. Suitable vegetable matter includes any vegetable matter which contains branched fructan molecules. In preferred embodiments, the vegetable matter is from grasses.

It will be understood by the skilled person that the fructan extract may be subjected to one or more purification steps prior to hydrolysis. Such purification steps include, but are not limited to, removal of particulate material by, for example, filtration or centrifugation, concentration, ion exchange, precipitation by one or more solvents, addition of ascorbic acid to prevent formation of colour.

Preferably, where solvent precipitation is undertaken the solvent is ethanol, more preferably 70% ethanol.

It will be apparent that conditions for hydrolysis will depend upon a number of factors including the enzyme used. In a preferred embodiment, the enzymatic hydrolysis is performed at 37° C. in a reaction containing 30% buffer (M$^c$Illvanes, pH5), 30% Novozyme 960 and 10% fructan. The reaction was incubated for 24 hours and terminated by heating to 80° C. for 10 minutes.

It will be understood by the skilled person that the branched fructans of the composition can be obtained from any suitable species or cultivar of grass, for example, *Lolium, Phleum*, Cocksfoot, Fescue, Barley, Oat and/or wheat.

Preferably, the one or more grasses comprise perennial high sugar grass (HSG).

High sugar grasses (fructan content of up to 30% dry wt.) grow in a wider range of geographies than traditional sources of fructans (chicory and Jerusalem artichokes), they are easier to harvest (not requiring the removal of the whole plant) and they are not a food crop.

Preferably, the one or more grasses are selected from one or more species of *Lolium, Festuca, Dactylis, Phleum, Hordeum* and/or *Triticum*.

Preferably, the one or more grasses are selected from *Lolium perenne, Festuca pratensis, Dactylis glomerata, Phleum pretense, Hordeum Vulgare* and/or *Triticum aestivum*.

Preferably, the one or more grasses are selected from Aber Magic, Aber Dart and/or S48 (*Lolium* spp).

The present invention also contemplates using both pre- and probiotics as ingredients in a combination which when combined, become synbiotics. The purpose of this is to combine the effects of new beneficial prebiotic to stimulate the body's own beneficial bacteria and the benefits of an additional probiotic microorganism. There is a high potential in the development and the consumption of such mixtures, since some of these may well show powerful synergistic nutritional and/or health effects.

Thus the composition of the present invention may be specifically designed to contain different components which can provide a synbiotic effect to the consumer.

In embodiments of the invention, the probiotic microorganism present in the composition may be a naturally occurring microorganism or it may be a transformed microorganism. The microorganism may also be a combination of suitable microorganisms.

In a preferred embodiment of the present invention the probiotic microorganism comprises a bacteria, mould and/or yeast. Preferably, the microorganisms are viable.

As used herein, the term viable means a microorganism which is metabolically active.

Preferably, the probiotic microorganism comprises a bacteria.

The skilled person will understand that by the term probiotic bacterium or strain it is meant a non-pathogenic microorganism which, when ingested live, exercises a beneficial effect on the host's health or physiology. These probiotic strains generally have the ability to survive the passage through the upper part of the digestive tract. They are non-pathogenic, non-toxic and exercise their beneficial effect on health on the one hand via ecological interactions with the resident flora in the digestive tract, and on the other hand via their ability to influence the immune system in a positive manner The probiotic strains most commonly used are principally bacteria and yeasts of the following genera: *Lactobacillus* spp., *Streptococcus* spp., *Enterococcus* spp., *Bifidobacterium* spp. and *Saccharomyces* spp.

Suitably, the microorganism may be a bacterium from one or more of the following genera: *Lactococcus, Streptococcus, Pediococcus, Enterococcus, Leuconostoc, Carnobacterium, Propionibacterium, Bifidobacterium, Lactobacillus, Micrococcus, Staphylococcus, Bacillus, Kocuria, Arthrobacter, Brevibacterium* and *Corynebacterium*.

A skilled person will readily be aware of specific species and or strains of microorganisms from within the genera described herein which are used in the food and/or agricultural industries and which are generally considered suitable for human and/or animal consumption.

For some embodiments the microorganism may be a mixture of more than one probiotic microorganisms (preferably more than on probiotic bacteria): a mixture of more than more lactic acid bacteria. Preferably, the mixture may comprise one or more stains from *Lactobacillus* spp, *Lactococcus* spp. *Bacillus* spp, *Streptococcus* spp and/or *Bifidobacterium* spp.

In one embodiment preferably the microorganism is at least one strain of *Lactobacillus* spp. In one embodiment preferably the microorganism is at least one strain of *Lactobacillus plantarum* and/or *Lactobacillus acidophilus*.

In one embodiment preferably the microorganism is at least one strain of *Lactococcus* spp. In one embodiment preferably the microorganism is at least one strain of *Lactococcus thermophilous*, and/or *Lactococcus lactis*.

In one embodiment preferably the microorganism is at least one strain of *Bifidobacterium* spp. In one embodiment preferably the microorganism is at least one strain of *Bifidobacterium bifidum* and/or *Bifidobacterium animalis*.

In one embodiment preferably the microorganism is at least one strain of *Bacillus* spp. In one embodiment preferably the microorganism is at least one strain of *Bacillus coagulans* and/or *Bacillus cereus*.

In one embodiment preferably the microorganism is at least one strain of *Streptococcus* spp. In one embodiment preferably the microorganism is at least strain one of *Streptococcus thermophiles*.

In a further preferred embodiment, the microorganism is a yeast. Preferably, one or more of the following genera: *Saccharomyces, Pichia, Bretanomyces, Candida, Debaryomyces, Hanseniaspora, Hansenula, Kloeckera, Metschnikowia, Schizosaccharomyces, Torulaspora,* and *Zygosaccharomyces*. More preferably the microorganism is a strain of *Saccharomyces* spp or *Pichia* spp.

It will be understood that the prebiotic of the present invent on may be administered simultaneously with (e.g. in admixture together with or delivered simultaneously by the same or different routes) or sequentially to (e.g. by the same or different routes) the probiotic microorganism and/or a metabolite thereof.

It will be understood by the skilled person that the branched fructan molecules of the present invention can be provided independently as either liquid or as solid/granulated compositions. In one preferred embodiment, the branched fructan molecules are provided as a solid.

Preferably, when said branched fructan molecules are in liquid form they are in the extract obtained by juicing the vegetable matter. Preferably said extract is concentrated. It will be understood that the branched fructan molecules can be precipitated to provide a solid prebiotic composition. It will be further understood that the feed/food supplement or prebiotic composition according to the present invention may be provided in the form of a solution or as a solid—depending on the use and/or the mode of application and/or the mode of administration.

In one embodiment the feed/food supplement or prebiotic composition according to the present invention is in a liquid formulation suitable for consumption, preferably such liquid composition contains either buffer, salts, sorbitol and/or glycerol.

In one embodiment, the feed/food supplement or prebiotic composition is solid, preferably as a tablet, a powder or in a granulated form.

Preferably, the feed/food supplement or prebiotic composition supplement further comprises at least one physiologically acceptable carrier.

The physiologically acceptable carrier is preferably selected from at least one of maltodextrin, limestone (calcium carbonate), cyclodextrin, wheat or a wheat component, sucrose, starch, anti-foam, Na[2]SC^[1] Talc, PVA and mixtures thereof.

In one embodiment the liquid feed/food supplement or prebiotic composition is dried on the physiologically acceptable carrier.

In one embodiment, the prebiotic composition is provided as a food supplement for human consumption.

Preferably, when provided as a food supplement, the prebiotic composition is provided as a unit dose. It will be understood by the skilled person that the unit dose can be any unit dose suitable for oral administration. The unit dose may be liquid, for example a solution or suspension in a container, or solid, for example, a tablet powder or capsule. In a preferred embodiment of the invention the unit dose is provided as a pelleted tablet or as a powder.

It will be understood that the feed supplement may be for any suitable animal, for example, sheep poultry, swine or companion animals such as dogs or cats.

It will be apparent that the feed supplement may contain the feed/food supplement or prebiotic composition in any suitable amount.

Preferably, the food/feed supplement comprises at least 0.1% by weight of the prebiotic composition. More preferably, the feed supplement may comprise at least 0.5%; at least 1%; at least 2%; at least 3%; or at least 4, 5, 6, 7, 8, 9, 10, 15, 20, 25, 30, 35, 40, 45, 50, 60, 70, 80 or 90% by weight of the prebiotic composition it will be obvious to the skilled person that the feed/food supplement or prebiotic composition according to the present invention may also comprise other components such as stabilising agents and/or bulking agents.

Preferably, the method of preparing a food/feed supplement according to the present invention comprises a mixing step that comprises admixing the prebiotic composition optionally with at least one physiologically acceptable carrier.

In a particular y preferred embodiment the food/feed supplement is homogenized to produce a powder.

In an alternative preferred embodiment, the food/feed supplement is formulated in to granules.

The method of preparing a feed supplement may also comprise the further step of pelleting the powder using any suitable method known in the art.

It will be understood that the feed supplement of the present invention is suitable for addition to any appropriate feed material.

It will be further understood that the prebiotic composition of the present invention may be added to any suitable food material.

As used herein, the term food material refers to the basic food material to be consumed by a human, it will be further understood that this may comprise, for example, at least one plant and/or animal material.

In a preferred example, the prebiotic composition of the present invention is added to a dairy product such as yoghurt.

As used herein, the term foodstuff refers to a food material to which one or more food supplements have been added.

As used herein, the term feed material refers to the basic feed material to be consumed by an animal, it will be further understood that this may comprise, for example, at least one or more unprocessed grains, and/or processed plant and/or animal material such as soybean meal or bone meal.

As used herein, the term feedstuff refers to a feed material to which one or more feed supplements have been added.

Optionally, the feedstuff may also contain additional minerals such as, for example, calcium and/or additional vitamins.

In another aspect there is provided a method for producing a feedstuff. Feedstuff is typically produced in feed mills in which raw materials are first ground to a suitable particle size and then mixed with appropriate additives. The feedstuff may then be produced as a mash or pellets; the later typically involves a method by which the temperature is raised to a target level and then the feed is passed through a die to produce pellets of a particular size. The pellets are allowed to cool. Subsequently liquid additives such as fat and enzyme may be added. Production of feedstuff may also involve an additional step that includes extrusion or expansion prior to pelleting—in particular by suitable techniques that may include at least the use of steam.

The feedstuff may be a feedstuff for a monogastric animal, such as poultry (for example, broiler, layer, broiler breeders, turkey, duck, geese, water fowl), swine (all age categories), a pet (for example dogs, cats) or fish.

The foodstuff or feedstuff may comprise at least 0.0001% by weight of the food/feed supplement. Suitably, the foodstuff or feedstuff may comprise at least 0.0005%; at least 0.0010%; at least 0.0020%; at least 0.0025%; at least 0,0050%; at least 0.0100%; at least 0.020%; at least 0,100% at least 0.200%, at least 0.250%, at least 0.500%, at least 0.750%, at least 1.00%, at least 1.50%, at least 1.75%, at least 2.00%, at least 3.00%, at least 4.00%, at least 5.00%, at least 6.00%, at least 7.00%, at least 8.00%, at least 9.00%, or at least 10.00%, by weight of the food/feed supplement.

The invention will now be further described with reference to the following figures in which.

Figure 6:
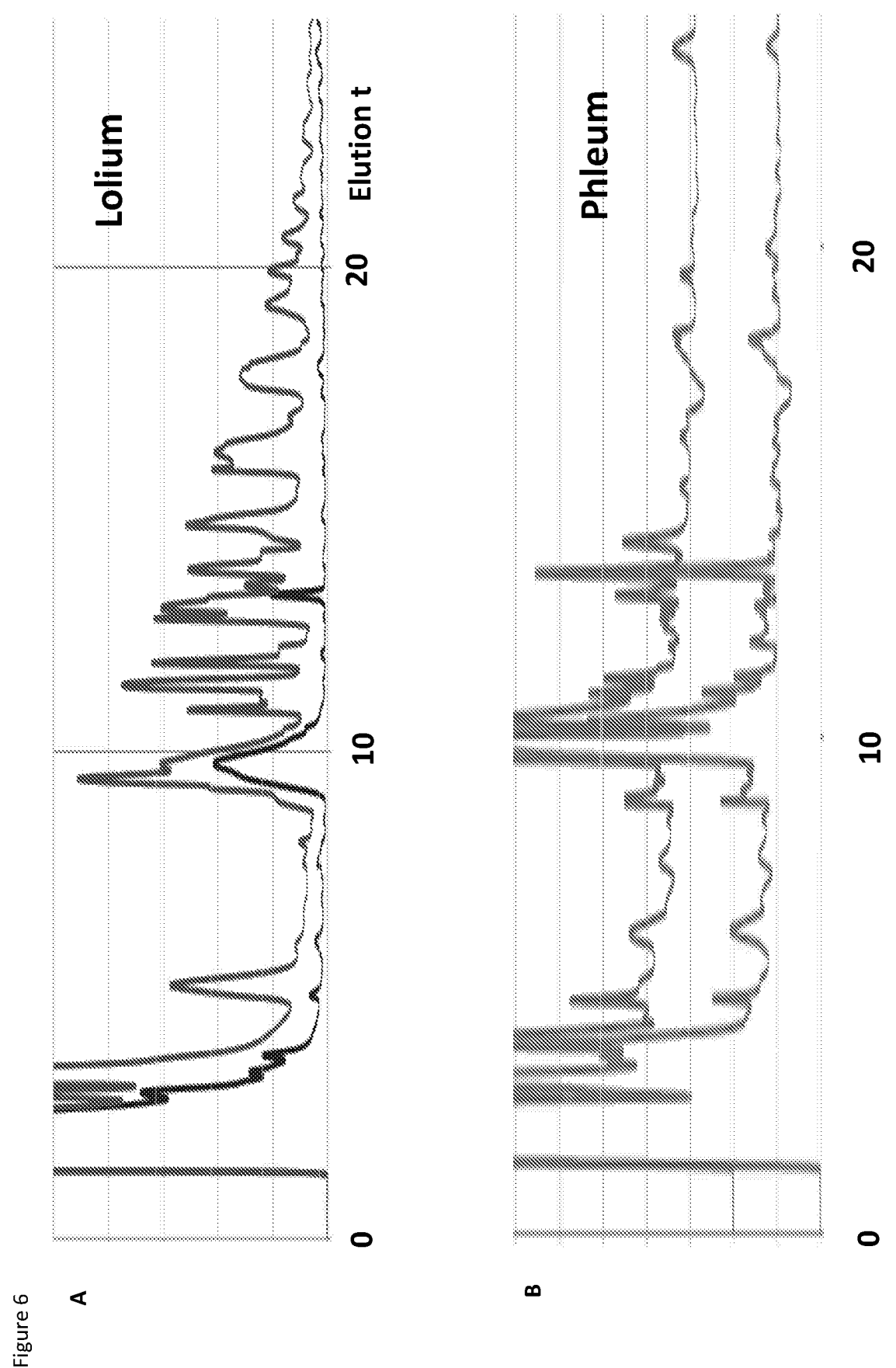

FIG. 6 shows the endo-hydrolase results from 6 species of grass. Similar profiles were obtained using the enzyme on *Lolium, Festuca* and *Phleum* (FIG. 6 panels A, B, C) while Barley, Wheat and Oat (FIG. 6 panels D, E, F) show a similar profile to each other. The difference in profile results from the fructans of Barley, Wheat and Oat being of lower molecular weight/short initial chain length.

Figure 7:
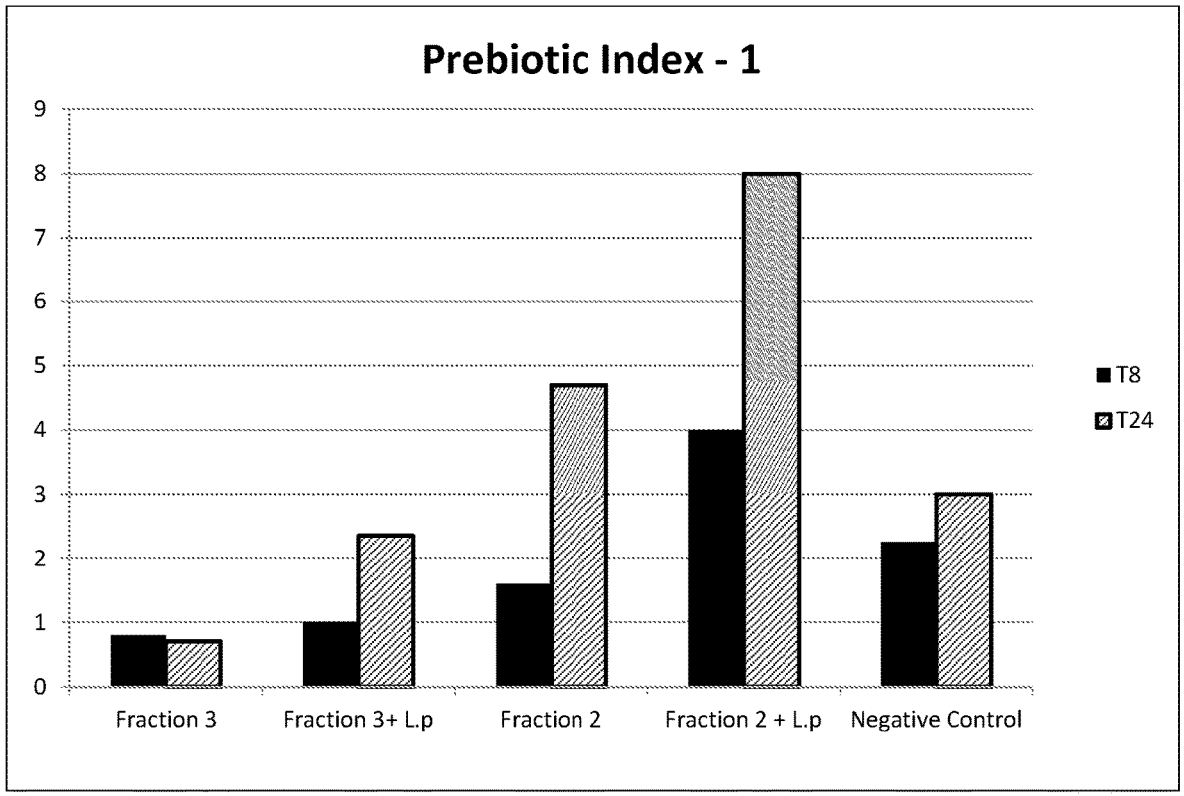

FIG. 7 shows the synbiotic effect of *L. plantarum* on two different fructan fractions.

Figure 8:
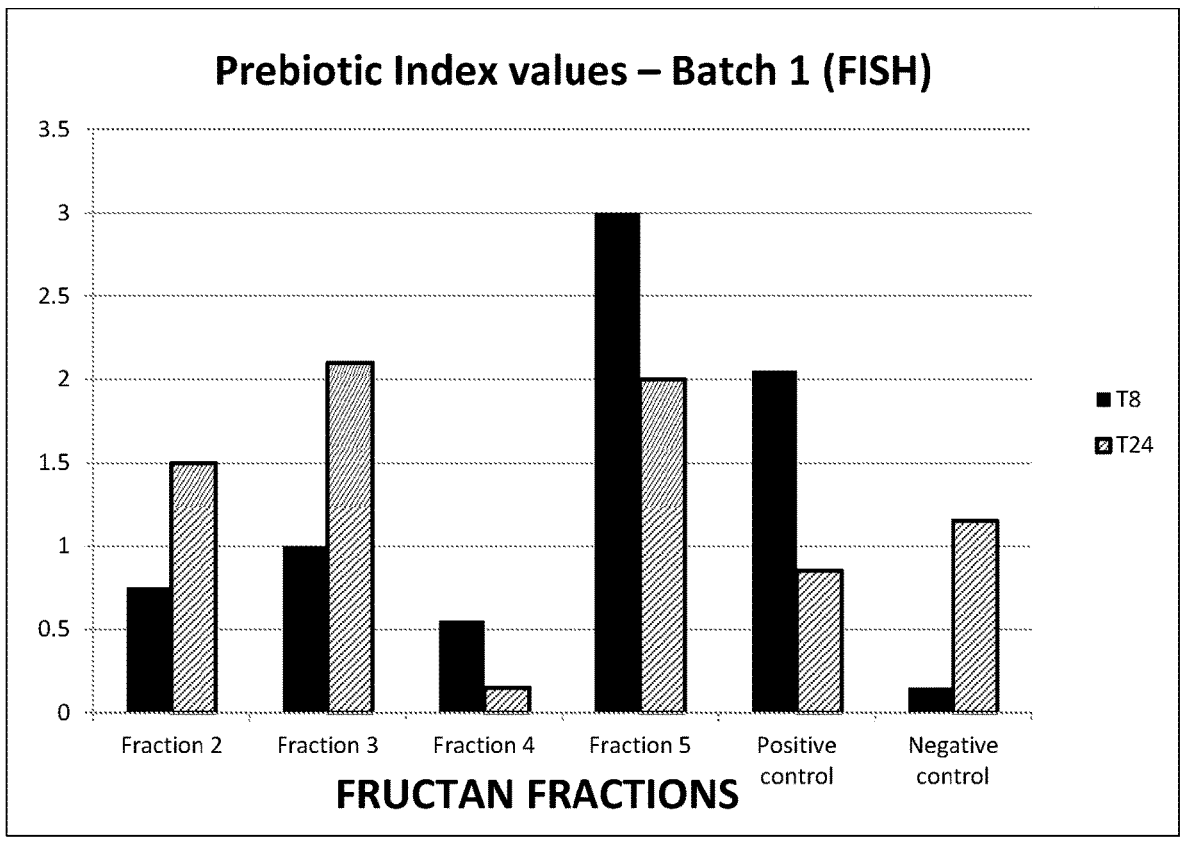

FIG. 8 shows the prebiotic index of various fraction of fructan molecules obtained grass after 8 and 24 hours.

Figure 9:
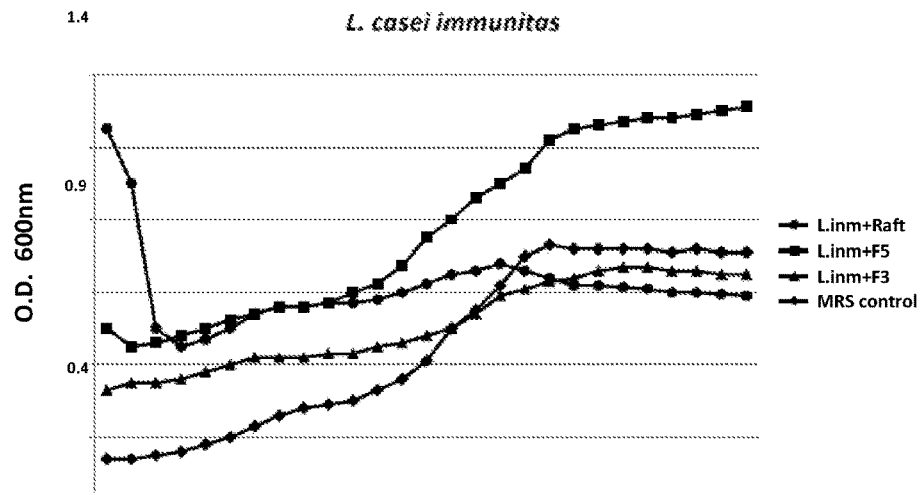
Figure 9:
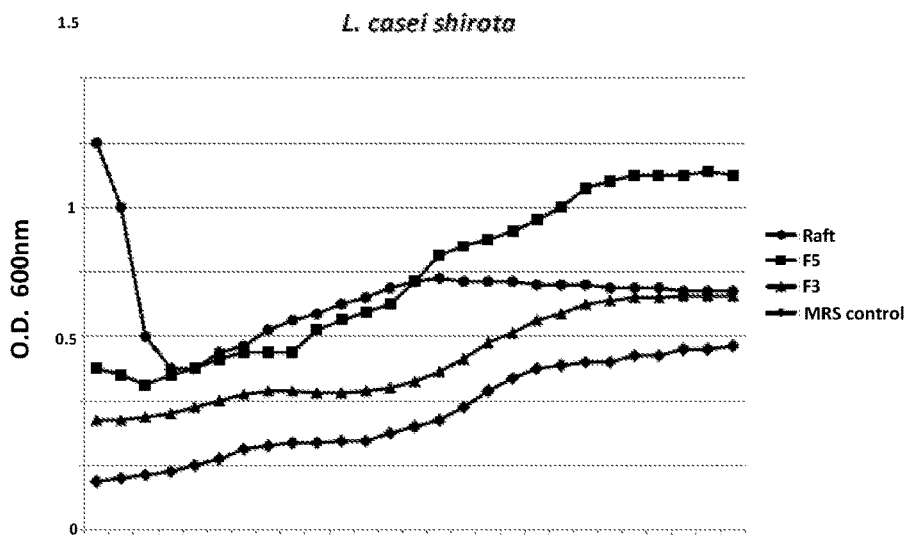

FIG. 9 shows the effect of various fructans fragments on the growth of two commercially used probiotic strains.

Figure 10A:
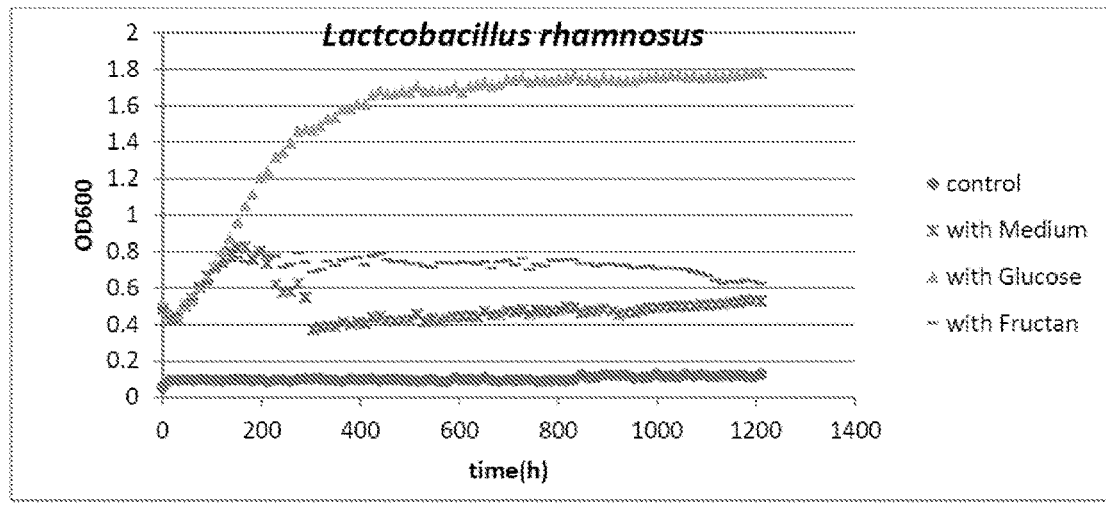
Figure 10B:
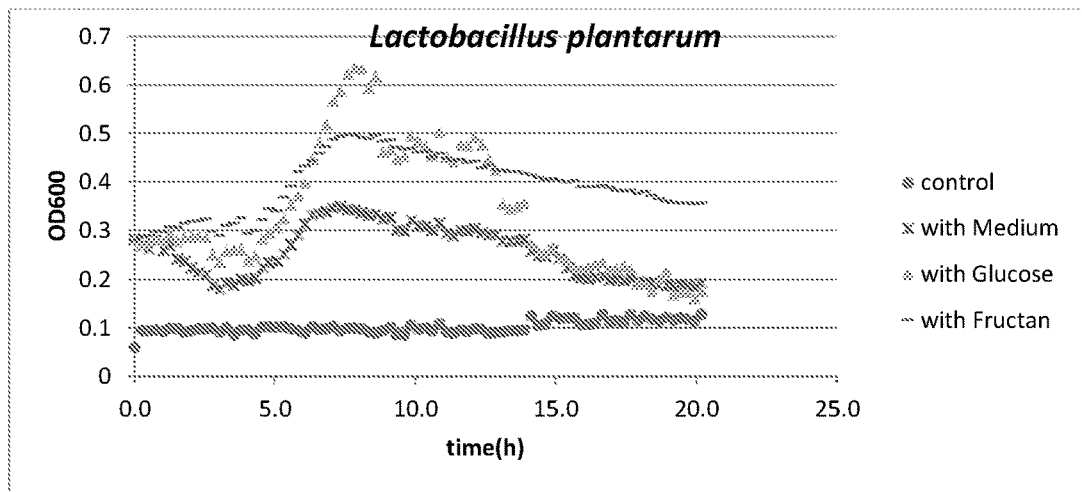

FIGS. 10A and 10B show the effect of an added carbon source on the growth of two *Lactobacillus* strains.

Figure 11A:
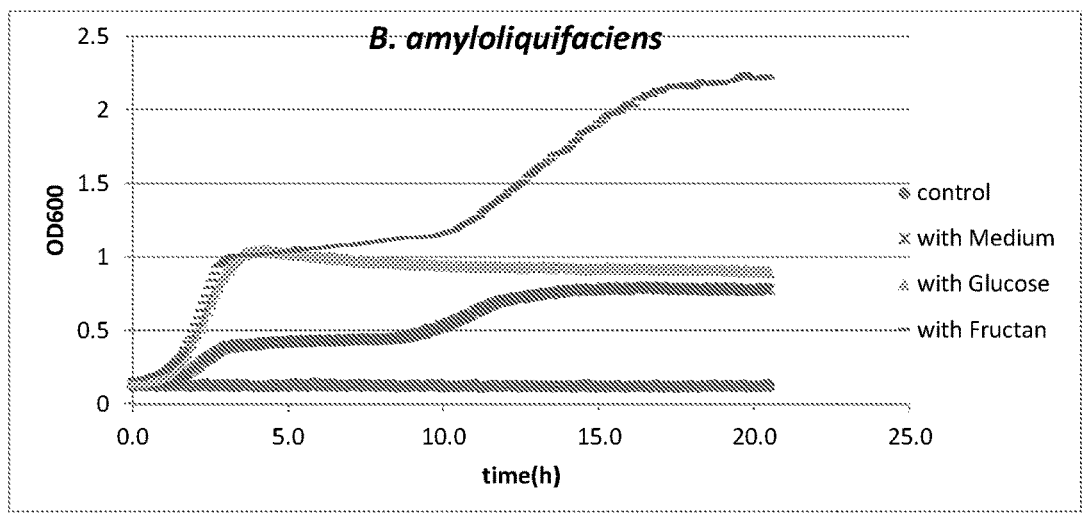

FIGS. 11A, B and C show the effect of an added carbon source on the growth of three *Bacillus* strains.

Figure 12:
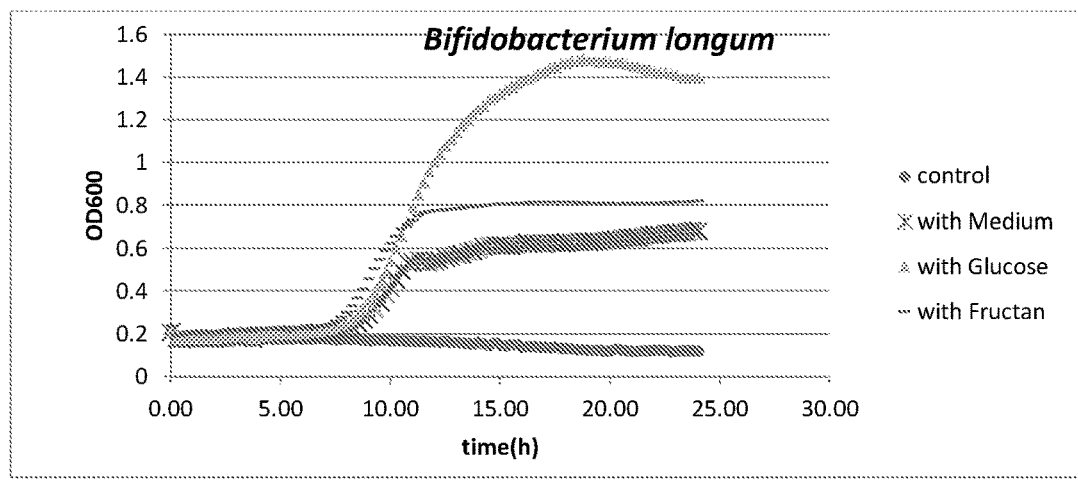

FIG. 12 shows the effect of an added carbon source on the growth of a *Bifidobacterium* strain.

Figure 13A:
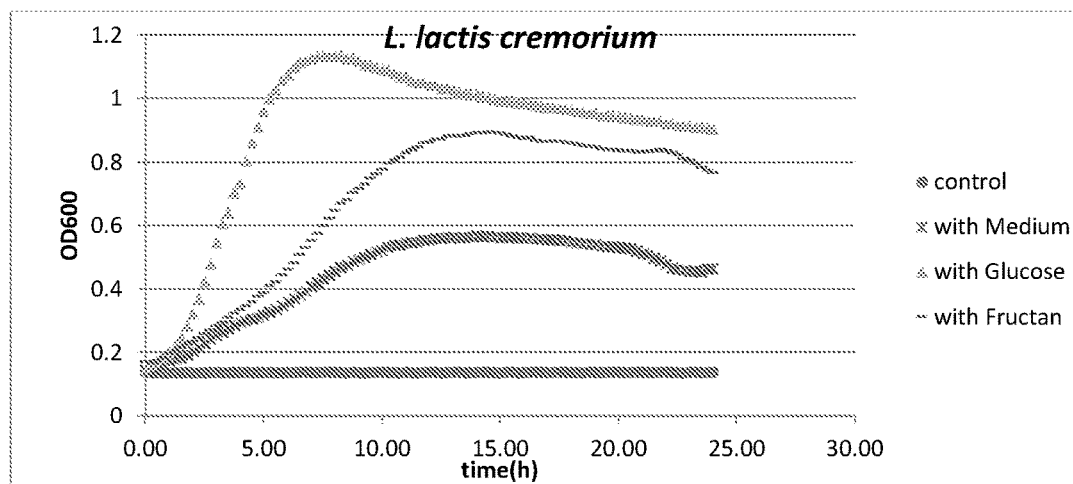

FIGS. 13A and B show the effect of an added carbon source on the growth of two *Lactococcus* strains.

DETAILED DISCLOSURE OF THE INVENTION

Unless defined otherwise, all technical and scientific terms used herein have the same meaning as commonly understood by one of ordinary skill in the art to which this disclosure belongs. This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

Other definitions of terms may appear throughout the specification. Before the exemplary embodiments are described in more detail, it is to understand that this disclosure is not limited to particular embodiments described, as such may, of course, vary, it is also to be understood that the terminology used herein is for the purpose of describing particular embodiments only, and is not intended to be limiting, since the scope of the present disclosure will be limited only by the appended claims. Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context dearly dictates otherwise. Thus, for example, reference to "a fructan" includes a plurality of molecules and equivalents thereof known to those skilled in the art, and so forth.

The publications discussed herein are provided solely for their disclosure prior to the filing date of the present application. Nothing herein is to be construed as an admission that such publications constitute prior art to the claims appended hereto.

The fermentation reaction is an aerobic process in which the molecular oxygen needed is supplied by a molecular oxygen-containing gas such as air, oxygen-enriched air, or even substantially pure molecular oxygen, provided to maintain the contents of the fermentation vessel with a suitable oxygen partial pressure effective in assisting the microorganism species to grow in a thriving fashion. In effect, by using an oxygenated hydrocarbon substrate, the oxygen requirement for growth of the microorganism is reduced. Nevertheless, molecular oxygen must be supplied for growth, since the assimilation of the substrate and corresponding growth of the microorganisms, is, in part, a combustion process.

In one aspect, preferably the probiotic fructan molecules for use in the present invention are in a purified form. The term "purified" means that the given component is present at a high level. The component is desirably the predominant component present in a composition. Preferably, it is present at a level of at least about 60%, or at least about 65%, or at least about 70%, or at least about 75%, or at least about 80% said level being determined on a dry weight/dry weight basis with respect to the total composition under consideration. For some embodiments the amount is at least about 85% said level being determined on a dry weight/dry weight basis with respect to the total composition under consideration.

In one aspect, preferably the probiotic fructan molecules for use in the present invention are used as a concentrate. The concentrate may be a concentrated form of the extract containing the fructans.

Methods

Procedure for the Isolation and Purification of Fructan from Grasses

1) Harvest Grass, chop and juice (9.15 kg S48, 9.32 Kg magic).
2) Juiced frozen until required.
3) Juice thawed in a warm water bath and then pasteurised (70-80° C.) 20 minutes.
4) Remove flocculated material by centrifugation.
5) Rotary evaporate to approx 0.25 of starting volume.
6) Precipitate Fructans with 90% EtOH and recovered by filtration.
7) Air dry.
Crude magic fructan 370 g Crude S48 fructan 142 g
8) Dissolve 10 g of Fructan in 100 mL $H_2O$ (magic=60.55 mg mL; S48 28.5 mg mL).
9) Heat to 60° C. and add stoichiometric quantities of $MgSO_4.7H_2O$ and $Ca(OH)_2$ and stirred for 10 minutes.
10) Clarify by centrifugation.
11) Repeat until solution is pale yellow. (S48 through a C18).
12) Precipitate by making up to 90% EtOH (−20° C.) to give clean slightly off white crystals.
13) Harvest by filtration and air dry.
14) Magic hygroscopic resuspended in 50 mL $H_2O$. S48 remained as a powder.
Magic=28.2 mg mL (14.1%) recovery
S48=2 g fructan (33% recovery)

Procedure for the Isolation of the Active Fructan Component from Grasses

Purification of the 75% Fraction of Magic Fructan.

Using the above method, low yields of purified fructan were obtained, and so we decided to exploit the properties of fructan solubility in ethanolic solutions. Based on results from ethanol ppt curves (data not shown) the 75% fraction was the most active.

1) Grind 10 g of dry Magic fructan (90% ethanol precipitate) to a fine powder.
2) Re-suspend powder in 50 v/w (500 mL) 95% ethanol, shake at 180 rpm, 30° C. for 24 h.
3) Remove supernatant by filtration (110 mm, Whatman 32 low ash) and discarded.
4) Re-suspend solid in 20 v/w of original weight (100 mL) 75% ethanol and shake at 180 rpm, 30° C. for 1 h.
5) Remove supernatant by filtration (55 mm, Whatman GF/A) and retain.
6) Re-suspend solid in 20 v/w of original weight (100 mL) 75% ethanol and shake at 180 rpm, 3° C. for 1 h.
7) Remove supernatant by filtration (55 mm, Whatman GF/A) and retain.
8) Re-suspend solid in 40 v/w of original weight (200 mL) 75% ethanol and shake at 180 rpm, 30° C. for 1 h.
9) Remove supernatant by filtration (55 mm, Whatman GF/A) retain and pool with the previous supernatants (400 mL). Add 100 mL of 75% ethanol to the solid and store at 4° C.
10) Wash 0.25 w/v (100 g) activated charcoal with 400 mL 75% ethanol and filter.
11) Add wet charcoal to the 400 mL of supernatant and re-suspend by stirring.
12) Filter the suspension and wash the charcoal with a further 400 mL 75% ethanol.
13) Pool the purified clear fractions, filter through a 0.45 μm membrane and remove the ethanol by rotary evaporation at 40° C.
14) Flash freeze the resulting concentrate, approx 78 mL, in a 500 mL glass beaker and freeze dry.

Procedure for the Isolation of the Active Fructan Component from Grasses

Modified for Use with Grass Pellets and the Use of the 70% Fraction which Incorporates the 75% Fraction with Some Additional Longer Chain Fructans 1) For 0.1 Kg of Aber Magic pellets, grind pellets to a fine powder.
2) Extract in 5 L of 70% ethanol overnight with stirring or shaking. (70% EtOH=700 mL EtOH+300 mL $H_2O$).
3) Filter/centrifuge and retain supernatant.
4) Prepare 1 kg of activated charcoal by soaking in 5 L of 70% ethanol (or less if possible). If working in bulk, best to just let it settle out for a few hours/overnight and decant as much as you can. Keep the ethanol.
5) Add supernatant to the charcoal and stir for a few hours. Allow to settle and decant as much as possible and retain supernatant.
6) Wash the charcoal with an equal volume (v/v) of 70% ethanol, allow to settle, decant as much as possible and filter.
7) Combine supernatants and reduce volume (rotary evaporate).

8) Freeze dry to form your active fructan ready for P2 (P2—Bio-Rad gel filtration Column) clean-up (remove Glucose, Fructose and Sucrose (GFS)).

9) Column prep.

Bed volume (cm$^3$) of the column, flow rate and elution volume were determined from the parameters within the Bio-Rad Bio-Gel instruction booklet for a 20 mL sample.

Prepare using 20 mM ammonium acetate.

10) Sample prep.

Dissolve fructan (800 mgs) in 2.5 mls of ammonium acetate buffer (20 mM) and inject into column at a flow rate of 0.5 ml/min. using the ammonium acetate buffer as the mobile phase.

11) Collect fractions in 3 mls aliquots directly into 7 ml of 100% ethanol.

12) Combine fractions containing fructan but no GFS.

13) Dry and store desiccated.

Procedure for the Isolation of the Active Fructan Component from Grasses

Investigating the Decolourisation of 70% Ethanolic Extract Using Calcium Hydroxide and Activated Carbon Inulin derived from Jerusalem artichoke, is routinely de-coloured by a combination of calcium hydroxide and activated carbon processing steps. The purpose of using calcium hydroxide is to form calcium carbonate ($CaCO_3$), in the presence of $CO_2$, which, while being inert to water soluble carbohydrates, reacts with and precipitates many of the impurities that are associated to the pigmentation of the crude extract. This procedure has been modified for application to the high sugar grass variety Aber Magic.

The over-all reaction gives:

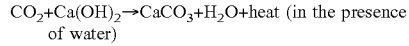

$CO_2 + Ca(OH)_2 \rightarrow CaCO_3 + H_2O +$ heat (in the presence of water)

Overall this reaction is slow and limited by the rate of solubility. Addition of sodium hydroxide, functions to catalyses the following reaction at high pH.

1) $CO_2 + H_2O \rightarrow CO_2$ (aq)

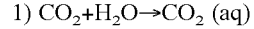

2) $CO_2$ (aq)+NaOH  $NaHCO_3$ (forming bicarbonate at high pH)

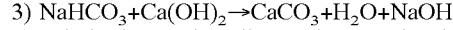

3) $NaHCO_3 + Ca(OH)_2 \rightarrow CaCO_3 + H_2O +$ NaOH

1) Grind 1 kg magic pellets and extract by shaking in 20 L of 70% ethanol overnight (16 h) at 30° C.

2) Remove the majority of particulates by filtering the ethanolic extract through a mashing sack and then through mirrar cloth and retain the supernatant.

3) De-water solids using a hydraulic press and filter through mirrar cloth, pool with the previously filtered supernatant.

4) In 4 L batches, raise the pH of the ethanolic extract to above pH 10 with approximately 8 mL of 5 M NaOH stirring constantly.

5) Add 50 mL aliquots of a 20% w/v suspension of calcium hydroxide ($Ca(OH)_2$) in 70% ethanol, and bubble carbon dioxide through the mix continuously.

6) Following the addition of 100 mL lots of $Ca(OH)_2$ remove 2 mL samples, centrifuged briefly to monitor colour.

7) When approximately 100 g of $Ca(OH)_2$ has been added monitor the colour until it changes from brown/green to pale green.

8) To the ethanolic extracted suspension add 200 g of powdered activated carbon in 500 mL 70% ethanol with continuous stirring for 5 minutes.

9) Monitor colour, if clear, filter (Whatman grade 1) under vacuum, and wash the carbon/calcium carbonate cake with 0.5 L 70% ethanol.

10) A white precipitate (possibly $CaCO_3$) forms in the filtrate, which can be removed by subsequent filtration.

11) The ethanolic extract was concentrated using a Buchi Rotavapor R-153.

12) Sample sent to IFR

Procedure for the Isolation of the Active Fructan Component from Grasses

In this process, the large amounts of charcoal were replaced by using ascorbic acid to reduce formation of colour (reducing agent—preventing PPO activity etc.). This procedure also includes the use of HP-20 (hydrophobic resin) step included to remove polyphenolics.

1) Harvest grass, Chop and Juice.

2) Add Ascorbic acid (to 50 mM).

3) Centrifuge and reduce volume to 0.25 original volume (rot evap).

4) Crash fructan using 90% ethanol (−20° C. 2 hr).

5) Wash with 90% ethanol.

6) Partition fructan by re-solubilising the active fraction in 70% ethanol.

7) Centrifuge.

8) Add charcoal to 5% w/v.

9) Filter and wash with 70% ethanol.

10) Reduce volume by rotary evaporation.

11) Pass through a column containing HP-20 resin.

12) Wash column, combine washes and re-filter.

13) Dry.

14) Resuspend in min. volume of water and pass through P-2 (Biorad) column (removes GFS).

15) Dry and store desiccated.

Procedure for the Isolation of the Active Fructan Component from Grasses

An Alternative Method to Reduce Dependence on Charcoal and Ethanol—Cross-Flow Filtration 1) Harvest grass.

2) Chop and Juice.

3) Centrifuge juice using a continuous centrifuge.

4) Collect liquid and ferment for 24 hr with Yeast (ethanol red 0.1% inoc. at 30° C.)—removes GFS.

5) Centrifuge.

6) Pasteurise and precipitate protein by passing through 120° C. Bath (copper piping—200 ml/min).

7) Centrifuge and filter to give a clear liquid.

8) Pass liquid through a cross-filtration unit containing a 5 kDa membrane (with 6 washes).

9) Collect samples (a) retentate (>5 KDa) and (b) filtrate (<5 KDa)—containing active component.

10) Reduce volume using rotary evaporation.

11) Dry samples.

12) Re-suspend in min. amount of water and de-colour (anion exchange cartridge).

Estimated time 2-3 days

Production of Fructan at Pilot Scale 2.5 tonnes of fresh grass was processed through a hammer mill and fed through a juice press (capacity 1 T/h). A volume of 70 L was further processed. The juice was spun in a continuous centrifuge to remove particulate material including lipids etc, (CEPA at 25,000 rpm, at a rate of 100 L/h). The resulting supernatant was pasteurised at 90° C. by flow through a heated bed (20 L/h). Particulate (denatured protein etc.) was removed by continuous centrifugation (40,000 rpm—at a flow rate of 100 L/h). The supernatant was subjected to ultra-filtration (10 kDa, 4.5 m2 filter—recycling flow rate of 5000 L/h and a filtrate rate of 300 L/h at 34 psi) to retain large molecular weight fructan. Starting from an initial 70 L volume, the fructans were concentrated in 12 L. The filtrate subsequently underwent nano-filtration (approx.

1 kDa 2.4 m2 filter running at 1000 L/h recycling flow and 100 L/h filtrate flow rate) to separate smaller prebiotic fructans from small sugars/salts etc. resulting in a reduction in volume from the original 70 L to 5 L. The fructan samples were cleaned up by passing through an ion exchange resin (10 L volume). A clean product consisting of the selected size classes was produced.

Figure 5:
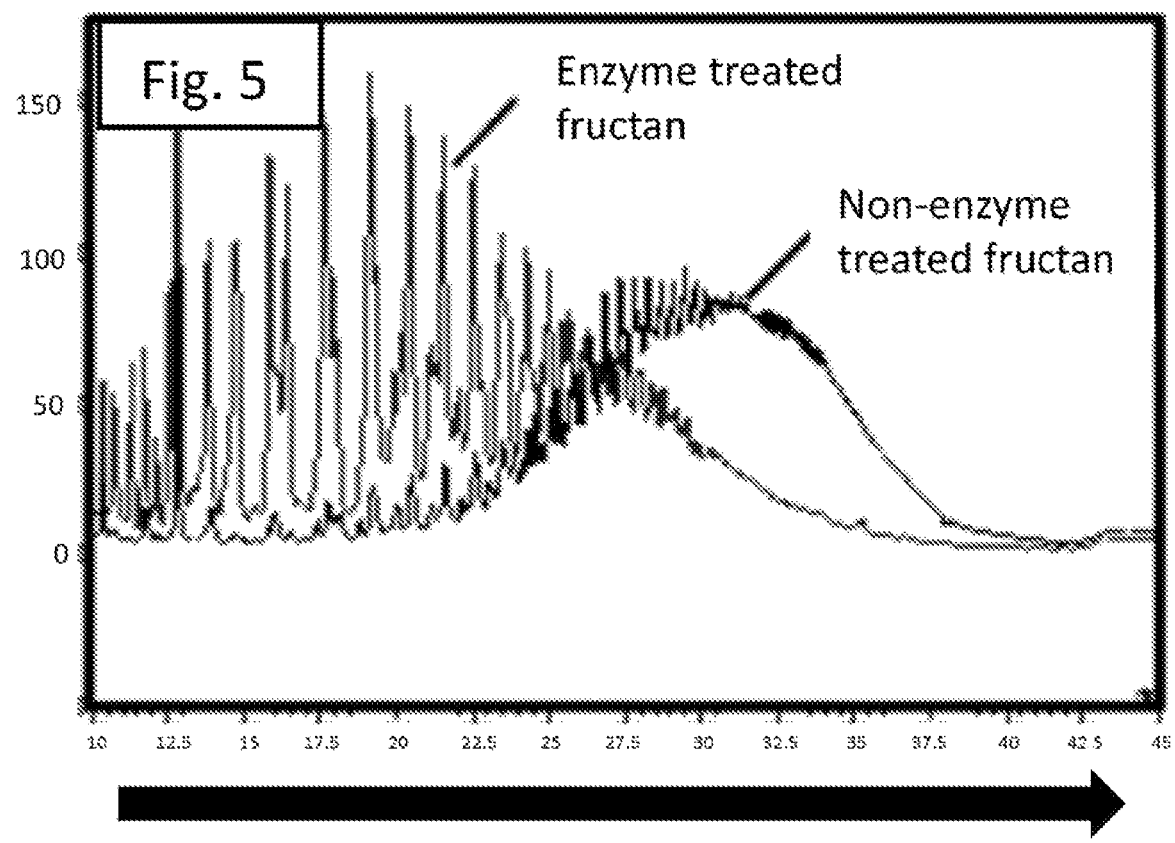
FIG. 5 shows the effect of endo-hydrolase on the size of the branched fructan molecules obtained from grass juice.

Increasing the 'prebiotic' fraction: Fructans from perennial ryegrass consist of long chains of fructose linked by β(2-1) or β(2-6) bonds. At any time, fructans in perennial ryegrass will consist of molecules ranging in length from 2 to over 150 fructose units. Initial studies demonstrated that fructans in the size range 10-50 chain length (gFOS75) showed the best prebiotic effect. However this component represents a small percent of the total fructan, with the majority having chain lengths in the 70-100 range. To increase the smaller fructan pool a number of fructan hydrolysing enzymes with either exo- and endo-activities were investigated. A Novozyme inulin endo-hydrolase enzyme preparation was found to completely convert large fructan to the size class found in gFOS75 (FIG. 5). This fraction will be referred to as (EHgFOS75).

Consistency of product: To determine the reproducibility of the process, a series of grass samples were processed including: 1) same grass processed 3 times (batch to batch variation); 2) grass harvested at different times of the year; 3) grass harvested over 2 seasons. The latter two sets of samples will have variation in the distribution of size-classes of fructan molecules. Following digestion with the fructan endo-hydrolase and clean up, each sample showed the same fructan size and class profile (by Dionex).

The results demonstrated that regardless of the initial fructan profile (variation due to environmental and seasonal effects) a consistent gFOS75 profile could be produced relatively easily following enzyme hydrolysis.

EXAMPLES

Analysis of Crude Fractions for Prebiotic Activity

Experimental Design

A preliminary evaluation of the potential prebiotic effect of 6 different fractions was performed.

The 6 fractions studied were:
Inu 2
Inu 20
Magic 20% Ethanol
Magic 50% Ethanol
Magic 60% Ethanol
Magic 75% Ethanol Batch Culture Fermentations To evaluate the potential prebiotic effect, static small scale 24 hour fermentations were performed using the above fractions as the sole source of carbohydrates. A vessel containing commercially available FOS prebiotic (Raftilose® P95) was included as a positive control. In the vessel used as a negative control the addition of carbohydrate was omitted. At time zero, basal medium was inoculated with 10% (w/v) faecal slurry. Faecal inoculum used was obtained from a healthy volunteer that had not taken any antibiotics pre- or probiotics in the previous 2 months. Eight fermentations were run in parallel at 37° C. and were maintained under oxygen-free atmosphere (10% H2; 10% CO2; 80% N2) using anaerobic cabinet (Don Whitley Scientific, Shipley, West Yorkshire, UK). Each vessel contained 1% (w/v) of the test fraction and samples were removed and processed at intervals over a 24 h period.

Bacterial Enumerations

Samples were taken at time 0, 4, 8 and 24 hours and were serially diluted with pre-reduced half strength peptone water, enriched with 0.5 g L-1 cysteine HCl (pH 7). 20 μL of each dilution were inoculated, in triplicate, onto agar plates designed to select for the total anaerobes as well as predominant groups of gut bacteria: enterobacteria, *Bacteroides*, bifidobacteria, lactobacilli and clostridia. The selective growth media used for the enumeration of major genera resident in the human large intestine were: Wilkins Challegren agar for total anaerobes; brucella bloodbased agar with addition of 75 mg L-1 kanamycin, 5 mg L-1 haemin, 75 mg L-1 vancomycin and 50 mL L-1 laked horse blood for bacteroides spp.; reinforced clostridia agar containing 8 mg L-1 novobiocin and 8 mg L-1 colistin for clostridium spp.; rogosa agar with 1.32 mL L-1 glacial acetic acid for *Lactobacillus* spp.; Columbia agar containing 5 g L-1 glucose, 0.5 g L-1 cysteine HCl and 0.5 mL L-1 propionic acid (adjusted to pH 5.0 using 4M NaOH) for *Bifidobacterium* spp.; Mac Conkey No 3 agar for Enterobacteria.

Bacterial counts for the different samples tested were calculated (results not shown) From the bacterial counts the prebiotic index (PI) of each fraction was calculated.

Calculation of Prebiotic index (PI).

Prebiotic Index=[(*Bifidobacterium*/Total)+(*Lactobacillus*/total)]−[(*Bacteroides*/total)+(Clos/Total)]

PI was calculated for each fraction after 8 hours of culture and after 24 hours of culture as shown in Table 1.

TABLE 1

PI values for the different fractions tested at 8 and 24 hours fermentations.

| | 8 Hours culture | 24 hours culture |
|---|---|---|
| Inu 2 | 0.95 | 3.65 |
| Inu 20 | 1.076 | 3.19 |
| Magic 20 | 0.265 | 2.942 |
| Magic 50 | 0.831 | 4.333 |
| Magic 60 | 1.082 | 3.228 |
| Magic 75 | 1.524 | 17.1 |
| Positive control | 0.806 | 4.382 |
| Negative control | 0.587 | 1.607 |

Figure 1:
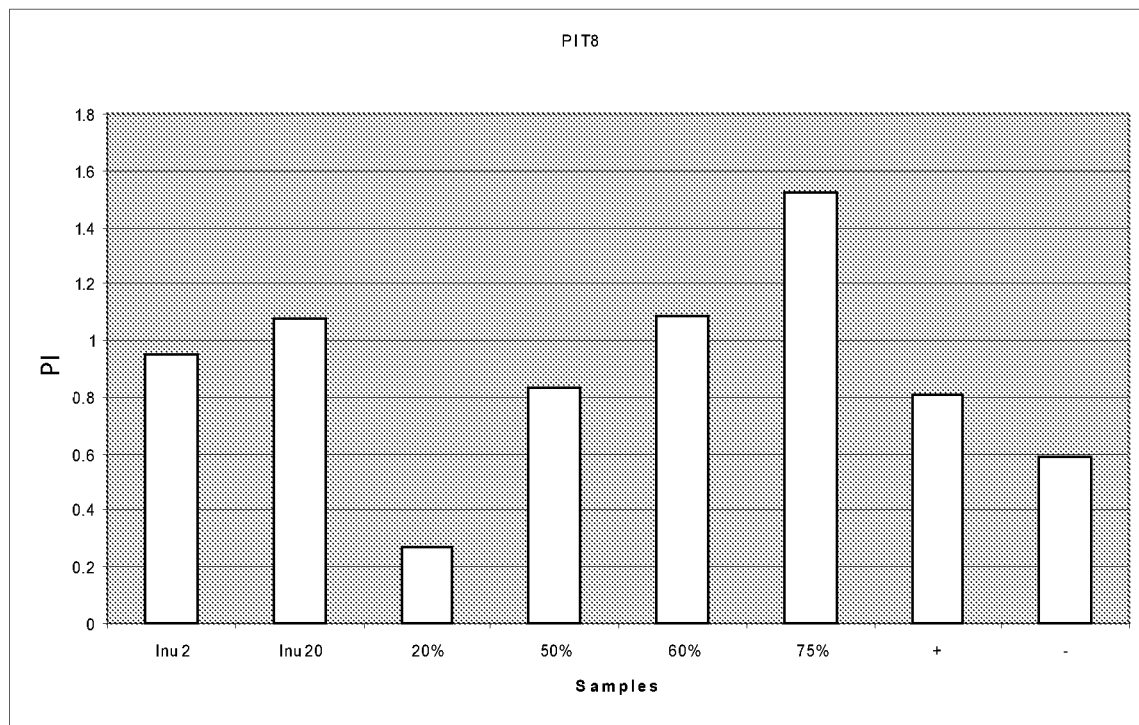
FIG. 1 shows the prebiotic index of various grass extracts after 8 hours fermentation with 10% w/v faecal slurry.
Figure 2:
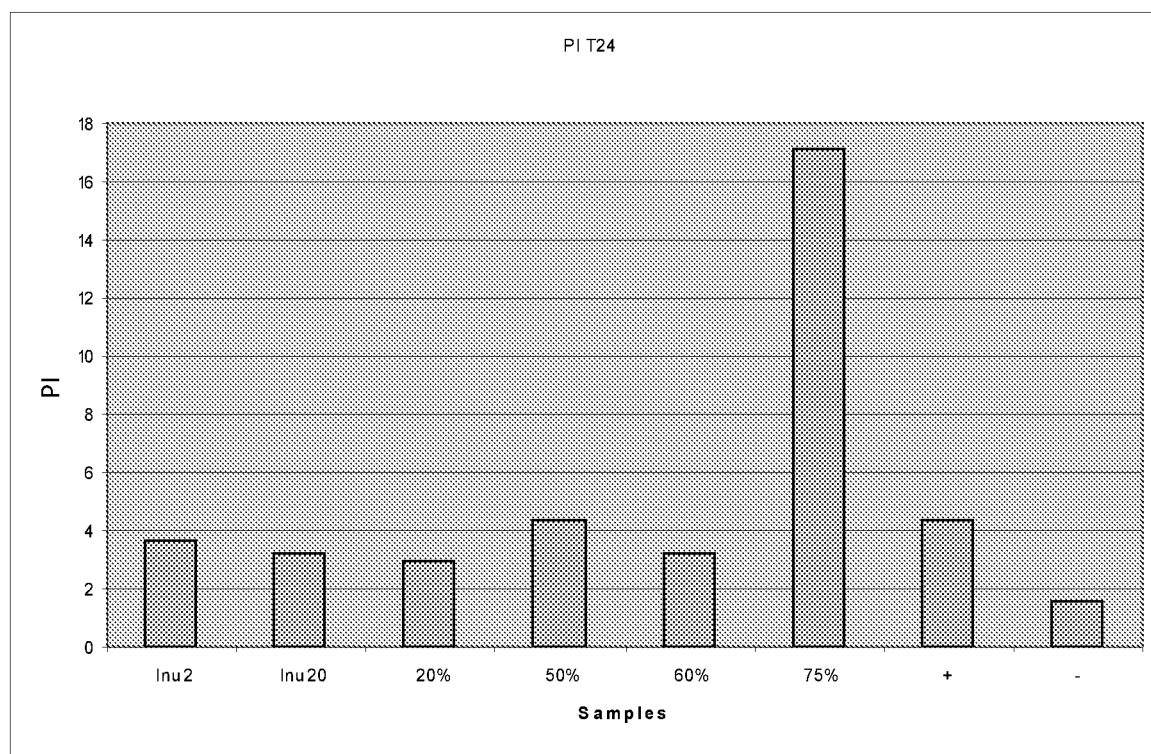
FIG. 2 shows the prebiotic index of various grass extracts after 24 hours fermentation with 10% w/v faecal slurry.

The PI values for the different fractions tested at 8 and 24 hours fermentations was calculated and is shown in FIGS. 1 and 2 respectively.

The results of PI at 8 and 24 hours are considered separately because the experiments were performed under static batch conditions where pH is not controlled. In this type of batch fermentation the bacterial numbers observed at 24 h may be affected by a drop in pH.

FIG. 1 shows that the PI values of fractions Inu2, Inu20 and 75% at T8 are considerably higher than the positive control (commercially available FOS prebiotic Raftilose® P95).

FIG. 2 shows the PI values at T24, these results clearly show a significantly greater PI value for the fraction extracted by 75% ethanol.

To determine more exact PI values for the most interesting fraction (75% Ethanol extracted) further studies with large scale pH-controlled faecal bacterial batch culture fermentation were performed using the full 3 stage continuous colon model.

Further Analysis of 75% Ethanol extracted fraction in the full 3 stage continuous colon model Experimental Design In this study two fractions of the original 75% Ethanol extracted carbohydrates were examined. These sub-fractions were:

a) Juice Fructans DT01381/53/1

Fructans extracted using the processes detailed herein using wet grass as the raw material b) Pellet Fructan Fructans extracted using the processes detailed herein using dried pelleted grass as the raw material Batch Culture Fermentations Previously static small scale 24 h fermentations were performed due to quickly determine those fractions with the greatest prebiotic activity. For this study a significantly larger sample was used to perform full 24 h batch fermentations using the above sub-fractions as a source of carbohydrates.

At time zero water-jacketed fermenters were filled with basal medium and each vessel inoculated with 1% (w/v) of the test fraction. A vessel containing the commercially available prebiotic FOS (Raftilose® P95) was included as a positive control. In the vessel used as a negative control the addition of carbohydrate was omitted. Each vessel was also inoculated with 10% (w/v) faecal slurry. Faecal inoculum used was obtained from a healthy volunteer that had not taken any antibiotics pre- or probiotics in the previous 2 months. Four fermentations were run in parallel at 37° C. maintained by a circulating water bath. Culture pH was controlled automatically and maintained at pH 6.8. Anaerobic conditions were maintained by sparging the vessels with oxygen-free nitrogen gas. Samples were removed and processed at intervals over a 24 h period.

Bacterial Enumerations

Samples were taken at time 0, 4, 8 and 24 hours and were serially diluted with pre-reduced half strength peptone water, enriched with 0.5 g L-1 cysteine HCl (pH 7). 20 µL of each dilution were inoculated, in triplicate, onto agar plates designed to select for the total anaerobes as well as predominant groups of gut bacteria: enterobacteria, *Bacteroides*, bifidobacteria, lactobacilli and clostridia. The selective growth media used for the enumeration of major genera resident in the human large intestine were: Wilkins Challegren agar for total anaerobes; brucella blood-based agar with addition of 75 mg L-1 kanamycin, 5 mg L-1 haemin, 75 mg L-1 vancomycin and 50 mL L-1 laked horse blood for bacteroides spp.; reinforced clostridia agar containing 8 mg L-1 novobiocin and 8 mg L-1 colistin for clostridium spp.; rogosa agar with 1.32 mL L-1 glacial acetic acid for *Lactobacillus* spp.; Columbia agar containing 5 g L-1 glucose, 0.5 g L-1 cysteine HCl and 0.5 mL L-1 propionic acid (adjusted to pH 5.0 using 4M NaOH) for *Bifidobacterium* spp.; Nutrient agar for total aerobes, Mac Conkey No 3 agar for Enterobacteria.

Methods Relating to Bacterial Growth Results Shown in FIGS. 10 to 13 Inclusive

Bacterial Strains and Culture Media

The following bacterial cultures obtained from an in-house culture collection and were used for pure culture growth experiments: *Lactobacillus rhamnous* and *Lactobacillus plantarum* were grown in MRS media and incubated at 37° C. without shaking. *Lacococcus lactis* subsp. *lactis* and *Lactococcus lactis* subsp. *cremorium* were grown in GM17 media and incubated at 30° C. without shaking. *Bifidobacterium longum* was grown in BHI media in anaerobic cabinet at 37° C. without shaking. *Bacillus subtilis* was grown in L-broth, *Bacillus amyloliquifaciens* was grown in BHI media and *Bacillus niacini* was cultured in TSB (tryptone soya broth). All *Bacillus* strains were incubated at 30° C. in a shaking incubator (200 RPM).

Measurement of Bacterial Growth Demonstrated in FIGS. 10 to 13 Inclusive

Bacteria were grown overnight (18 h) in the corresponding liquid media and were used to inoculate (1% v/v) into fresh media with a final volume 300 ul in Bioscreen honeycomb 100-well plates in triplicates (Thermo Life Sciences, Basingstoke, UK). The carbon source added was either glucose or fructan fraction at a final concentration of 1% (w/v). The cultures were incubated at the appropriate temperature for 20-24 h in the Labsystems Biosceen C (Thermo Life Sciences) and growth was measured at $OD_{600}$ by taking readings at 15 minute intervals. The plates were shaken for 5 s prior to measurement of the optical density. For growth of *Bacillus* the plates were continuously shaken. For growth of Bifidobacteria the Biscreen C equipment was kept at 37° C. in an anaerobic cabinet (Don Whitley anaerobic workstation).

Results

Bacterial counts for the different samples tested were calculated (results not shown) From the bacterial counts the prebiotic index (PI) of each fraction was calculated as shown in Table 2.

TABLE 2

Values of PI for the different fractions tested at 4 and 24 hours fermentations.

| | 4 Hours culture | 24 hours culture |
|---|---|---|
| Juice fructans | 0.864 | 1.284 |
| Pellet fructans | 0.156 | 0.909 |
| Positive control | 1.338 | 0.999 |
| Negative control | 0.385 | 0.109 |

Figure 3:
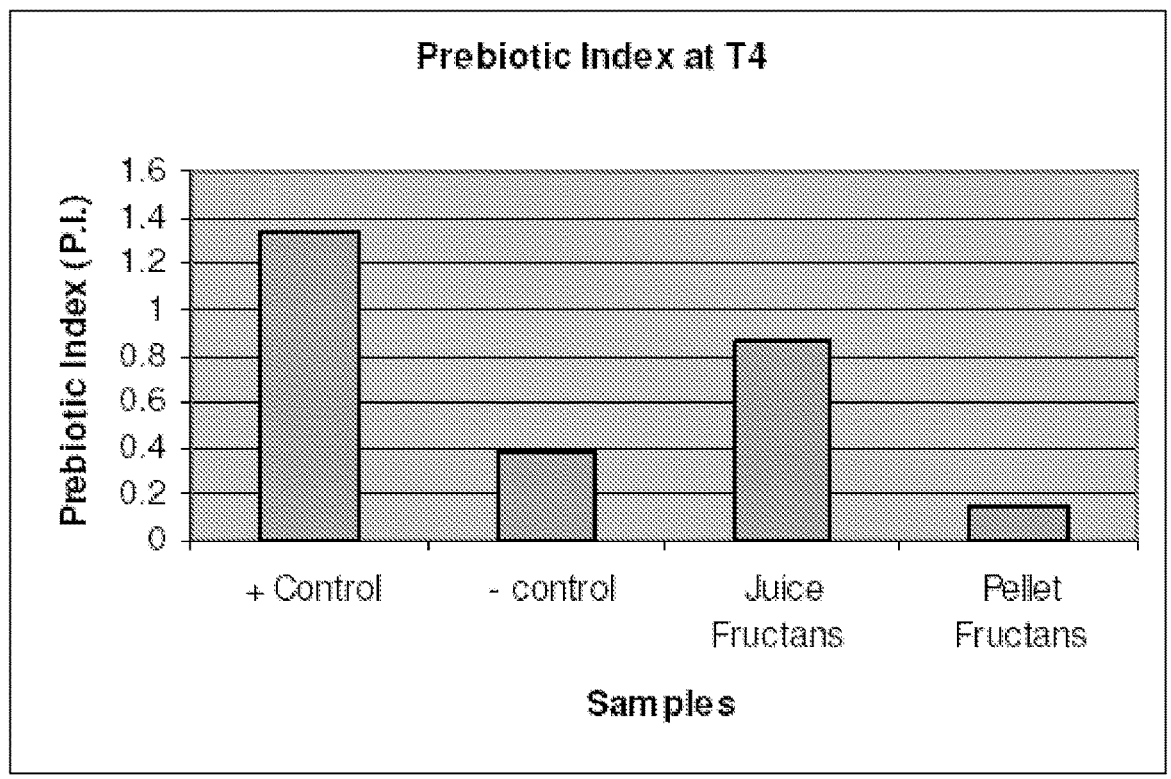
FIG. 3 shows the prebiotic index of various grass extracts after 4 hours fermentation with 10% w/v faecal slurry.
Figure 4:
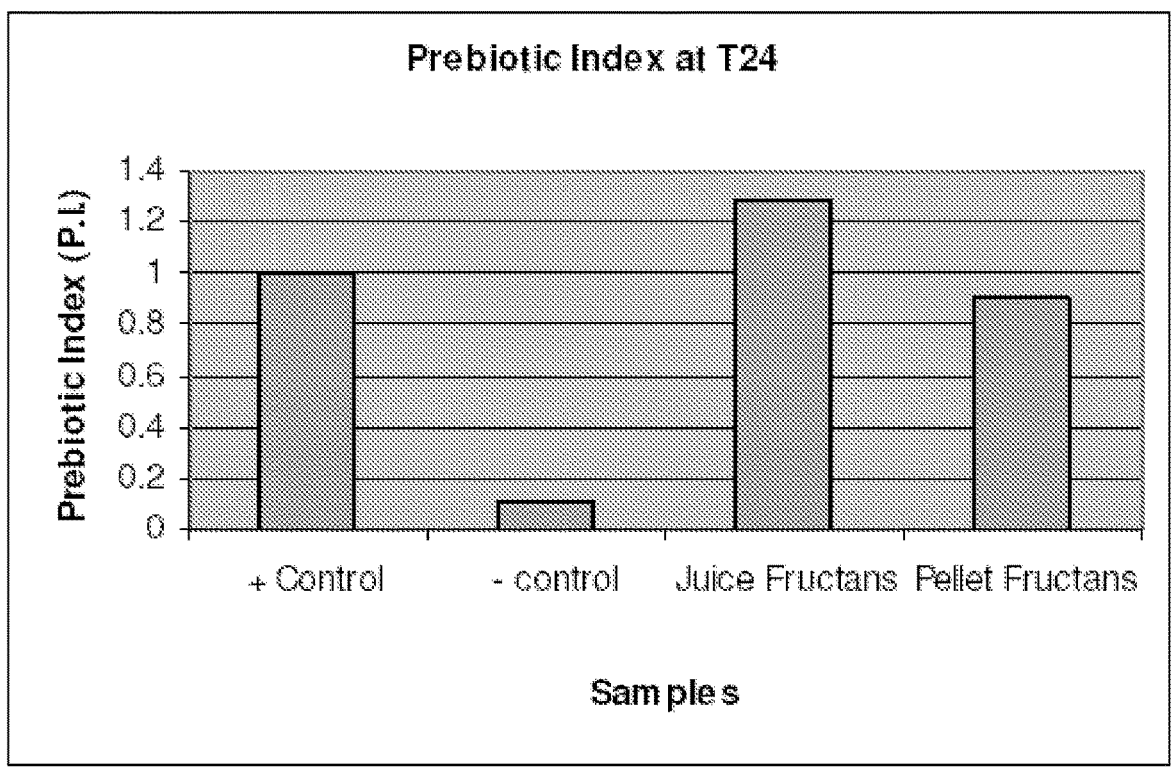
FIG. 4 shows the prebiotic index of various grass extracts after 24 hours fermentation with 10% w/v faecal slurry.

The calculated PI values at 4 and 24 hours are shown in FIGS. 3 and 4.

By conclusion of the fermentation at T24 both sub-fractions had a P.I. that was at least equivalent to the positive control (commercially available FOS prebiotic Raftilose® P95) with the juice fructans showing a higher P.I. than the positive control. Thereby demonstrating that prebiotic materials can be extracted from both wet and dried pelleted grasses by the protocols detailed herein and which have equivalent prebiotic potential as the commercially available FOS prebiotic Raftilose® P95.

The results shown in FIGS. 1 and 2 show that of the total fructan molecules extracted from the grass, only a specific size range gave a significant prebiotic effect i.e that extracted using 70-75% ethanol.

Use of Endo-Hydrolase to Increase Prebiotic Fraction

Using an endo-fructan hydrolysing enzyme, which cleaves fructan molecules at specific points in the chain, the remaining non-prebiotic fraction can be converted to fructan with shorter chain lengths as shown in FIG. 5. Using this method a fructan molecule size profile similar to that of the 70-75% prebiotic fraction can be obtained.

The digests were shown to be consistent and independent of starting material as demonstrated with grass samples from different harvests over the season and between different, data not shown.

FIG. 6 shows the endo-hydrolase results from 6 species of grass. As can be seen from panels A, B and C, similar profiles were obtained using the enzyme on *Lolium*, *Festuca* and *Phleum* (FIG. 6 panels A, B, C) while Barley, Wheat and Oat (FIG. 6 panels D, E, F) show a similar profile to each other. The difference in profile results from the fructans of Barley, Wheat and Oat being of lower molecular weight/ short initial chain length.

The ability of a number of commercial probiotic strains, as well specific members of the human gut bacteria, to utilise the isolated oligosaccharide fractions as a source of carbon and energy was investigated.

Synbiotic Effect of the Prebiotic Fructan Fragment.

A number of experiments were set up to determine the prebiotic effect of grass fructans and a possible synergistic effect by including the probiotic *L. plantarum*.

To test whether the inclusion of the bacterium *L. plantarum* as a probiotic enhances the biological activity of the prebiotic fructans initial batch culture experiments were undertaken. As shown in FIG. 7, the PI of gFOS75 (labelled as fraction 2) or large fructan size-classes (labelled as fraction 3), in the presence or absence of *L. plantarum*, in a culture containing a complex mixed faecal ecosystem after 8 and 24 hours fermentation was calculated. *L. plantarum* is known to produce an extracellular fructan exo-hydrolase enzyme. The results show that the growth of *L. plantarum* was stimulated to a higher degree by gFOS75 (fraction 2). The results demonstrate that *L. plantarum* plays a symbiotic role in both fractions, however, it acts as a better probiotic with fraction 2 than with fraction 3 and that fraction 2 (gFOS75) is a better prebiotic than fraction 3.

Prebiotic Activity of EHgFOS75

To test whether the fraction (EHgFOS75) produced following hydrolysis of large fructan to a size class equivalent to gFOS75 has prebiotic activity further fermentation experiments were undertaken. Four fructan fractions were used. Fraction 2—gFOS75 component; Fraction 3—large chain fructan; Fraction 4—large chain fructans but treated with boiled enzyme, and Fraction 5—EHgFOS75. Raftilose, a commercial prebiotic was used as a positive control and culture media without glucose as a negative control.

Following fermentation in static cultures, EHgFOS75 (Fraction 5) showed a higher prebiotic index compared to gFOS75, see FIG. 8, indicating that the enzyme hydrolysis method could be used to increase the quantity of prebiotic fructan from grasses.

It appears that Fraction 5 (EHgFOS75) shows a higher prebiotic index than both the gFOS75 fraction (Fraction 2) and the positive control.

Effect of Prebiotic Fructans on Probiotic Strains

To test the effect of fructans on a selection of probiotic strains a number of strains were selected to carry out pure culture fermentations. Strains selected were either commercial probiotic strains or in-house strains with potential probiotic properties. Each strain was grown in the presence of either fraction 3 (large fructans) or fraction 5 (EHgFOS75). Raftilose was used as a positive control and MRS media without glucose as a negative control. FIG. 9 shows that better growth was observed for *L. casei immunitas* and *L. casei shirota* in the presence of fraction 5 (EHgFOS75) than fraction 3. Fraction 5 also performed better than the commercial product.

Referring to the methods and measurements relating to bacterial growth shown in FIGS. 10 to 13 inclusive, positive results were obtained with *L. Rhamnous* and *L. plantarum* as both growth curves in FIGS. 10A and 10B show that culture OD is higher with inclusion of fructans. Positive controls of addition of glucose show high growth as expected but increased growth with fructans indicates that the fructans are exerting a prebiotic effect insofar that both *Rhamnous* and *L. plantarum* can utilise the fructans as a carbon source.

Figure 11B:
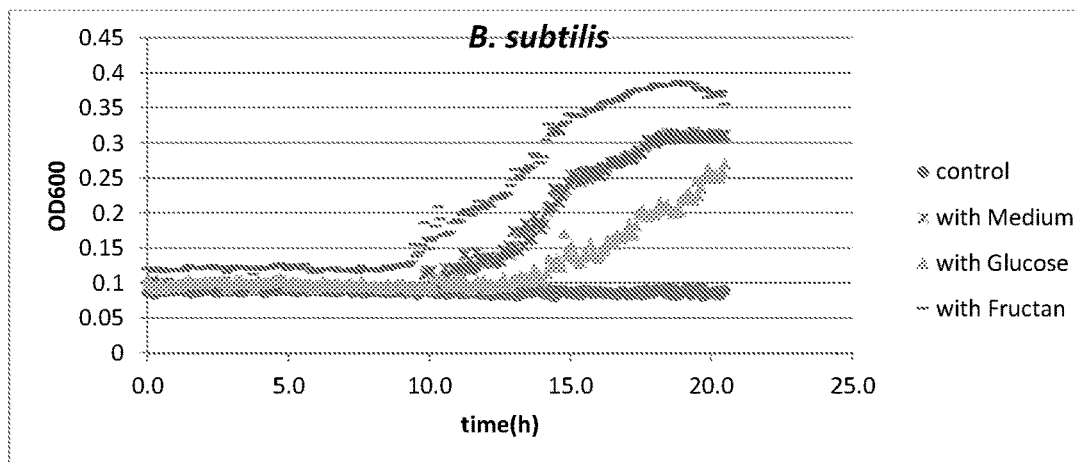
Figure 11C:
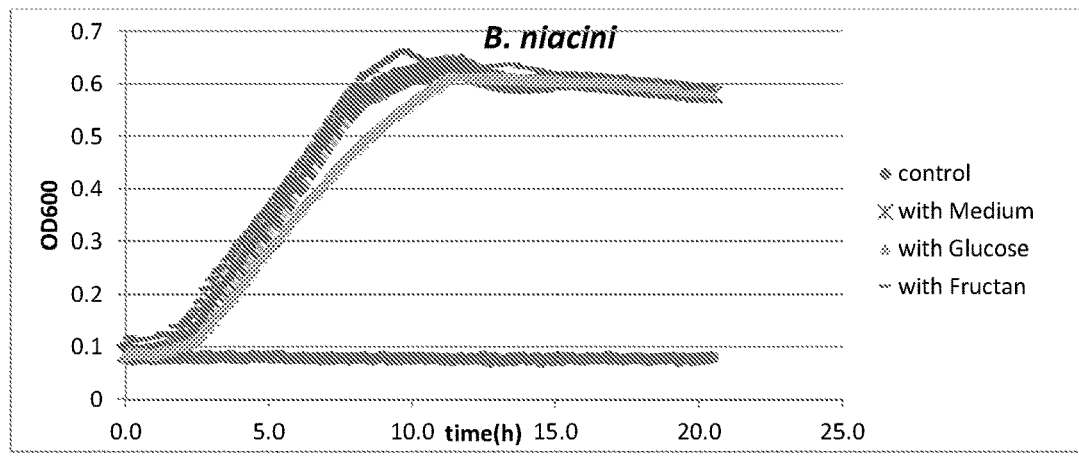

*Bacillus* media has to contain glucose for the bugs to grow—the line in FIGS. 11A to 11C relating to "with glucose" refers to additional glucose being added to the media to supplement growth. Positive results were seen with *B. amyloliquifaciens* and *B. subtilis* as addition of fructan is actually stimulating growth over and above addition of extra glucose to the media—conclusively demonstrating that the fructans are a very suitable carbon source for two out of the three *Bacillus* species. There is also a slight improvement with *B. niacini*.

Figure 13B:
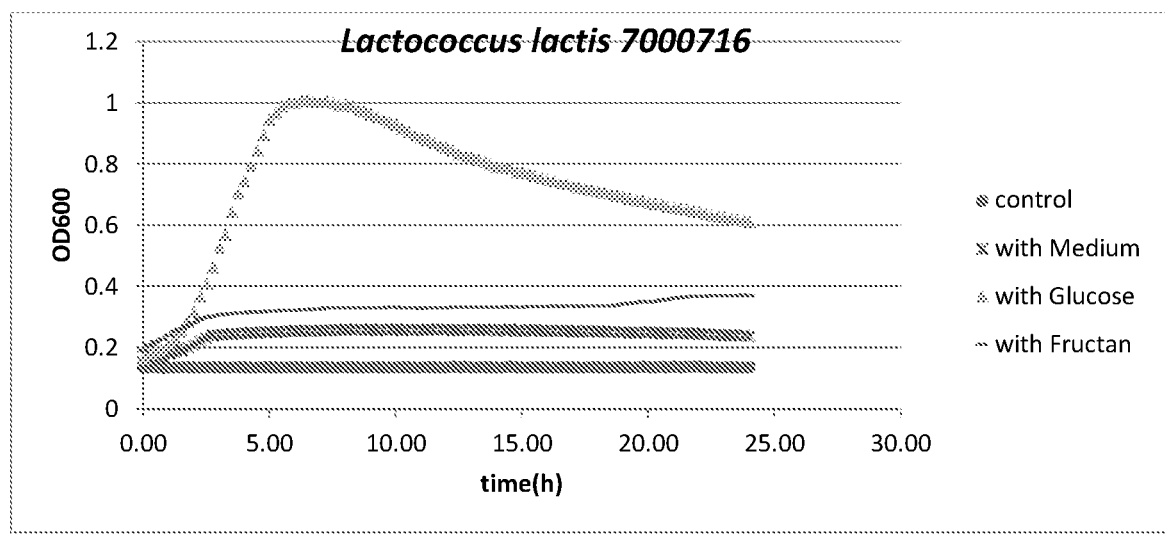

Referring to FIG. 12, the results are similar to *Bacillus*, the media contained glucose before extra supplementation. Positive results are demonstrated with *B. longum*. Referring to FIGS. 13A and 13B, no glucose in the unsupplemented media was required with these strains of *Lactococcus*. Very positive results seen with *L. cremorium* and slight positive with *L. lactis*. Ultimately whilst the I. cactis reading is low and a fraction of that with the glucose supplementation, the final OD for the samples is nearly twice that of the "media alone" reading (0.38 vs 0.23 or 165% that of the control).

The inventors have provided at least one example of prebiotic stimulation of growth for each of the bacterial species tests. With the data presented as final OD of "plus fructan" vs "media alone" as in Table 3 below the results suggest that at least some of the fructan is being utilised.

TABLE 3

| Strain | Maximum OD | | Percentage increase |
| --- | --- | --- | --- |
| | Media alone | Plus fructan | |
| *Lactobacillus rhamnosus* | 0.8 | 0.8 | 0** |
| *Lactobacillus plantarum* | 0.35 | 0.5 | 43 |
| *B. amyloliquifaciens* | 0.8 | 2.25 | 280 |
| *B. subtilis* | 0.31 | 0.375 | 21 |
| *B. niacini* | 0.65 | 0.67 | 3 |
| *Bifidobacterium longum* | 0.7 | 0.85 | 21 |
| *L. lactis cremorium* | 0.55 | 0.9 | 64 |
| *Lactococcus lactis* 7000716 | 0.25 | 0.35 | 40 |

TABLE 3 Results from FIGS. 10 to 13 inclusive presented as % increase in final OD.
**Initial rapid increase in OD seen with/without frutans but frutans appeared to maintain culture OD at a much higher level over time.

It has been demonstrated that the total fructan from grass can be converted to the prebiotic form using a fructan endo-hydrolysing enzyme, and that there are synergistic enhancements of the prebiotic activity by the inclusion of, for example, a *Lactobacillus* strain that has the capability of hydrolysing fructan through the action of an extracellular fructan exo-hydrolase.

Enhancements of the prebiotic activity have also been shown by the inclusion of *Bacillus, Bifidobacterium* and *Lactococcus* strains.

All publications mentioned in the above specification are herein incorporated by reference in their entirety. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in biochemistry and biotechnology or related fields are intended to be within the scope of the following claims.

The invention claimed is:

1. A composition comprising branched fructan molecules derived from a fructan extract of perennial high sugar grass (HSG) selected from the group consisting of AberMagic cultivar, AberDart cultivar, and S48 (*Lolium* spp), and obtained by enzymic endo-hydrolase hydrolysis, wherein said branched fructan molecules have a molecular weight of between 0.3 to 3 kDa, and wherein at least 50% of the branched fructan molecules present in the composition have a molecular weight of between 0.48 and 1.9 kDa.

2. The composition according to claim 1, wherein the molecular weight of the branched fructan molecules of the composition is between 0.48 and 1.9 kDa.

3. A composition comprising the composition according to claim 1 and the probiotic microorganism *Lactobacillus plantarum*.

4. The composition according to claim 1, wherein at least 80% of the branched fructan molecules in the prebiotic composition have a molecular weight of between 0.48 and 1.9 kDa.

5. A feed or food supplement comprising the composition according to claim 1.

6. The food supplement according to claim 5 for human administration.

7. The feed supplement according to claim 5 for administration to at least one of sheep, poultry, swine, dog, cat, or fish.

8. The feed or food supplement according to claim 5 comprising at least 0.1% at least 0.5%; at least 1%; at least 2%; at least 3%; or at least 4, 5, 6, 7, 8, 9, 10, 15, 20, 25, 30, 35, 40, 45, 50, 60, 70, 80 or 90% by weight of the composition.

9. A feedstuff or foodstuff comprising a feed or food material and the feed or food supplement according to claim 5.

10. The feedstuff or foodstuff according to claim 9, comprising at least 0.0001%, at least 0.0005%; at least 0.0010%; at least 0.0020%; at least 0.0025%; at least 0.0050%; at least 0.0100%; at least 0.020%; at least 0.100% at least 0.200%; at least 0.250%; at least 0.500%, at least 0.750%, at least 1.00%, at least 1.50%, at least 1.75%, at least 2.00%, at least 3.00%, at least 4.00%, at least 5.00%, at least 6.00%, at least 7.00%, at least 8.00%, at least 9.00%, or at least 10.00%, by weight of the feed or food supplement.

11. A method of producing a composition comprising branched fructan molecules, said method comprising the step of hydrolysing a fructan extract from one or more perennial high sugar grasses selected from the group consisting of AberMagic cultivar, AberDart cultivar, and S48 (*Lolium* spp), wherein said hydrolysis step comprises an enzymatic hydrolysis step performed by an endo-hydrolase enzyme on the fructan extract; wherein the branched fructans have a molecular weight of between 0.3 to 3 kDa, and wherein at least 50% of the branched fructan molecules present in the composition have a molecular weight of 0.48 to 1.9 kDa.

12. The method according to claim 11, further comprising subjecting the fructan extract to one or more purification steps prior to hydrolysis, optionally wherein said purification step comprises ethanol precipitation with 70% ethanol.

13. A method of making a feed or foodstuff comprising adding to a feed or food material a feed or food supplement according to claim 5 or the composition according to claim 1.

* * * * *